(12) United States Patent
Park et al.

(10) Patent No.: US 10,038,465 B2
(45) Date of Patent: Jul. 31, 2018

(54) APPARATUS AND METHOD FOR CONTROLLING POWER

(71) Applicant: Samsung Electronics Co., Ltd., Gyeonggi-do (KR)

(72) Inventors: Yong-Jun Park, Gyeonggi-do (KR); Namjun Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/671,963

(22) Filed: Aug. 8, 2017

(65) Prior Publication Data
US 2018/0076844 A1 Mar. 15, 2018

(30) Foreign Application Priority Data
Sep. 9, 2016 (KR) .................. 10-2016-0116604

(51) Int. Cl.
| | |
|---|---|
| H04B 7/00 | (2006.01) |
| H04B 1/04 | (2006.01) |
| H04B 1/3827 | (2015.01) |
| H04W 52/22 | (2009.01) |
| H04W 52/34 | (2009.01) |

(Continued)

(52) U.S. Cl.
CPC ........ *H04B 1/3838* (2013.01); *H04W 52/226* (2013.01); *H04W 52/228* (2013.01); *H04W 52/283* (2013.01); *H04W 52/34* (2013.01); *H04W 52/367* (2013.01)

(58) Field of Classification Search
CPC ...... H01B 1/38; H01B 1/3827; H01B 1/3823; H01B 1/3838; H01B 17/101; H04W 52/04; H04W 52/18; H04W 52/146; H04W 52/226; H04W 52/228; H04W 52/283; H04W 52/288; H04W 52/367; H04M 2250/12
USPC ....... 455/67.11, 68, 127.1, 127.2, 522, 550.1
See application file for complete search history.

(56) References Cited

U.S. PATENT DOCUMENTS

| | | | | |
|---|---|---|---|---|
| 8,483,632 B2* | 7/2013 | Asrani | ................ | H04W 52/245 455/117 |
| 8,798,664 B2* | 8/2014 | Yun | ..................... | H04B 1/3838 455/522 |

(Continued)

FOREIGN PATENT DOCUMENTS

KR 101601244 3/2016

*Primary Examiner* — Quochien B Vuong
(74) *Attorney, Agent, or Firm* — The Farrell Law Firm, P.C.

(57) ABSTRACT

An electronic device includes a communication unit; a memory storing instructions; and a processor, coupled to the communication unit and memory, to execute instructions to determine, based on at least one of a state of the electronic device and a distance between the electronic device and a user, a value of specific absorption rate (SAR) corresponding to the value of SAR that corresponds to a power of the electronic device; determine, based on the SAR, an average SAR on a designated time interval; determine, in response to the average SAR being greater than a first designated value, a reference value limiting a maximum power of the electronic device; and transmit a signal based on the determined reference value through the communication unit, wherein the reference value includes a value obtained by subtracting a second designated value from a value of maximum output power of the electronic device.

20 Claims, 15 Drawing Sheets

(51) Int. Cl.
  *H04W 52/28* (2009.01)
  *H04W 52/36* (2009.01)

(56) References Cited

U.S. PATENT DOCUMENTS

| | | | |
|---|---|---|---|
| 8,825,105 B2* | 9/2014 | Hsieh | H04W 52/283 |
| | | | 455/522 |
| 8,831,528 B2* | 9/2014 | Shi | H04B 1/3838 |
| | | | 455/67.11 |
| 8,909,282 B2 | 12/2014 | Ngai et al. | |
| 9,253,733 B1* | 2/2016 | Lee | H04W 52/283 |
| 9,622,187 B2* | 4/2017 | Logan | H04W 52/18 |
| 2014/0213192 A1* | 7/2014 | Lagnado | H04W 52/0254 |
| | | | 455/67.11 |
| 2015/0323472 A1* | 11/2015 | Lee | G01N 22/00 |
| | | | 324/639 |

* cited by examiner

APPARATUS AND METHOD FOR CONTROLLING POWER

PRIORITY

This application claims priority under 35 U.S.C. § 119(a) to Korean Patent Application Serial No. 10-2016-0116604, which was filed in the Korean Intellectual Property Office on Sep. 9, 2016, the entire content of which is incorporated herein by reference.

BACKGROUND

1. Field of the Disclosure

The present disclosure generally relates to an apparatus and method for determining a value of specific absorption rate (SAR) and controlling the power output of an electronic device.

2. Description of the Related Art

For wireless communication between electronic devices, an electronic device radiates an electromagnetic wave signal using an antenna. The radiated electromagnetic wave signal may do harm to the human body. The electronic device that radiates the electromagnetic wave signal measures a SAR. The SAR is a rate in which the electromagnetic wave signal radiated from the electronic device is absorbed by biological tissue. Several authorized institutions manage, by standards, the extent of harm to the human body through the measured SAR. To meet these standards, an electronic device must decrease power to such a level that the intensity of the electromagnetic wave radiated from the electronic device does not harm the human body, or a radiator (antenna) design structure must be changed.

As a method for decreasing power output, a time average power control technology may be applied to the electronic device. However, in a case where the time average power control technology is used to control a radiated electromagnetic wave signal, the electronic device must assume a high value of SAR, because the time average power control technology does not consider the proximity between a user and an antenna of the electronic device. That is, the electronic device fails to properly reflect the proximity between the user and the electronic device, in that the electronic device determines whether to lower a reference value of limiting the output power of the electronic device, using the power of the electronic device output for a constant time.

In a case of uplink (transmission from a user equipment (UE) to a base station BS) bursts, the time average power control technology cannot restore the reference value of limiting the output power of the electronic device to the original maximum power threshold value until the average power is sufficiently lowered, so there is a problem in that the power output may suddenly decline.

SUMMARY

An aspect of the present disclosure provides an apparatus and method for determining a value of SAR based on adjacency or non-adjacency between a user and an electronic device and the occurrence or non-occurrence of an event, thereby determining an average SAR value affecting the user.

In accordance with an aspect of the present disclosure, an electronic device is provided. The electronic device includes a communication unit (e.g. communication device), a memory storing instructions, and one or more processors, coupled to the communication unit and the memory, configured to execute the instructions to determine, based on at least one of a state of the electronic device and a distance between the electronic device and a user of the electronic device, a value of SAR corresponding to the value of SAR that corresponds to a power of the electronic device, determine, based on the determined value of SAR, an average value of SAR on a designated time interval, determine, in response to the average value of SAR being greater than a first designated value, a reference value limiting a maximum power of the electronic device, and transmit a signal based on the determined reference value through the communication unit, wherein the reference value includes a value obtained by subtracting a second designated value from a value of maximum output power of the electronic device.

In accordance with another aspect of the present disclosure, a method of an electronic device is provided. The method includes determining, based on at least one of a state of the electronic device and a distance between the electronic device and a user of the electronic device, a value of SAR corresponding to the value of SAR that corresponds to a power of the electronic device, determining, based on the determined value of SAR, an average value of SAR on a designated time interval, determining, in response to the average value of SAR being greater than a first designated value, a reference value limiting a maximum power of the electronic device, and transmitting a signal based on the determined reference value, wherein the reference value includes a value obtained by subtracting a second designated value from a value of maximum output power of the electronic device.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION OF EMBODIMENTS OF THE PRESENT DISCLOSURE

Figure 1:
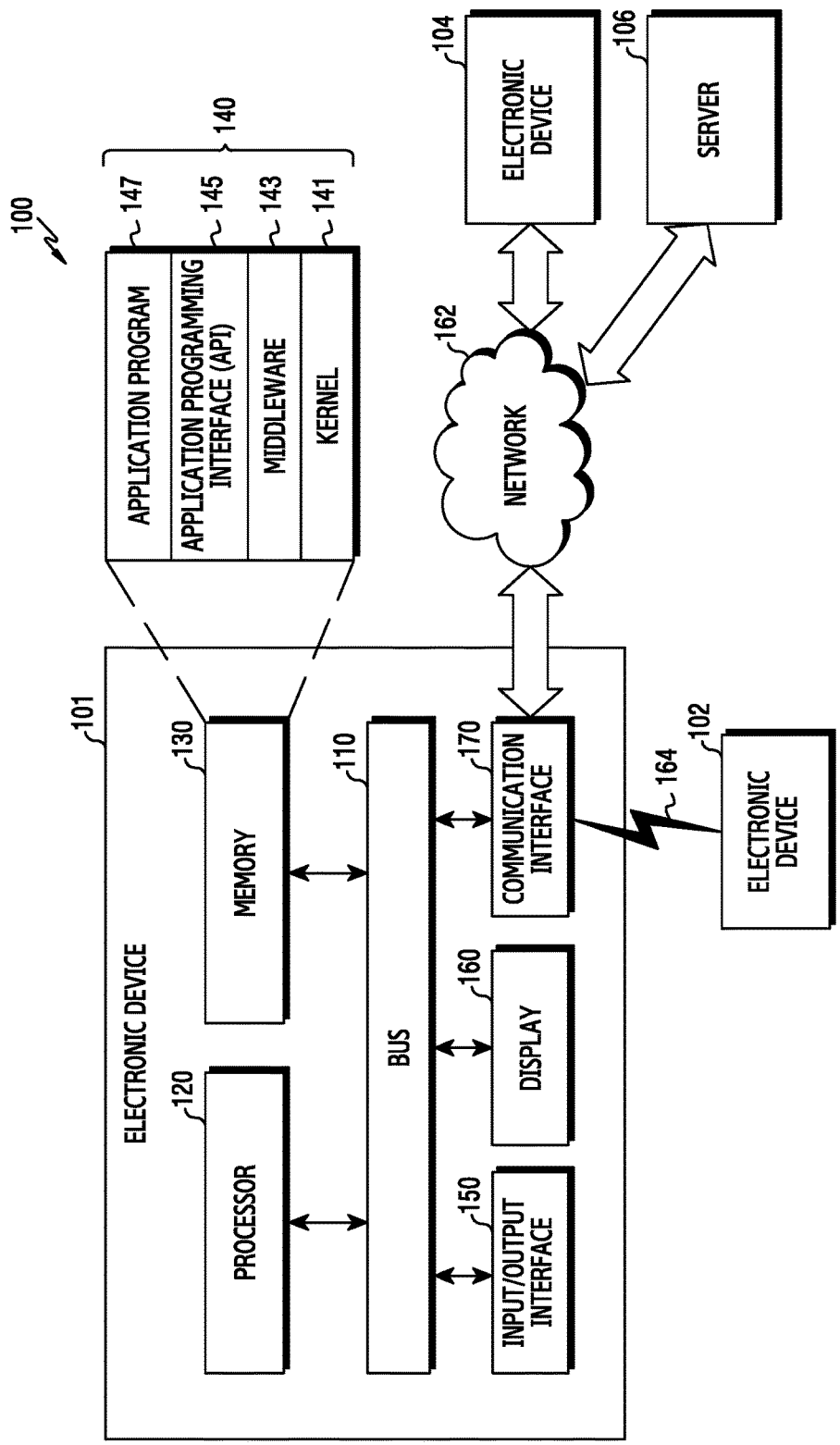
FIG. 1 illustrates a network environment including an electronic device, according to an embodiment of the present disclosure.

Hereinafter, certain embodiments of the present disclosure are described with reference to the accompanying drawings. The embodiments and terms used herein do not limit the technology disclosed herein to specific forms, and should be construed as including various changes of the corresponding embodiment, equivalents thereof, and/or alternatives thereof. In the drawings, like reference symbols may denote like constituent elements. The expression of a singular form may include the expression of a plural form unless the context clearly indicates otherwise. In the present disclosure, the expressions "A or B", "at least one of A and/or B", etc. may include all combinations of words enumerated together. The expressions "first", "second", "first", "second", etc. may modify corresponding constituent elements irrespective of order and/or importance, and are used to distinguish one constituent element from another constituent element and do not limit the corresponding constituent elements. When it is disclosed that any element (e.g., first element) is "(operatively or communicatively) coupled with/to" or is "connected to" another constituent element (e.g., second element), the first element may be directly coupled to the second element, or be coupled through another element (e.g., a third element).

The expression "configured (or set) to" as used in the present disclosure may be used interchangeably with, for example, "suitable for", "having the capacity to", "designed to", "adapted to", "made to", or "capable of" in a hardware or software in accordance with the circumstances. The expression "device configured to" may represent that the device is "capable of" together with other devices or components. The expression "processor configured (or set) to perform A, B and C" may represent a dedicated processor (e.g., embedded processor) for performing a corresponding operation, or a general-purpose processor (e.g., a central processing unit (CPU) or an application processor (AP)) capable of performing corresponding operations by executing one or more software programs stored in a memory device.

An electronic device according to an embodiment of the present disclosure may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), a moving picture experts group (MPEG-1) audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). The electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

The electronic device may include at least one of various medical devices (e.g., various portable medical measurement devices (e.g., a blood glucose sensor, a heat rate sensor, a blood pressure monitor, a body temperature meter, etc.), a magnetic resonance angiography (MRA) device, a magnetic resonance imaging (MRI) device, a computed tomography (CT) device, imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automated teller machine (ATM), a point of sale (POS) terminal, or an Internet of Things (IoT) device (e.g., a light bulb, various sensors, a sprinkler device, a fire alarm, a thermostat, a streetlight, a toaster, an exerciser, a hot water tank, a heater, a boiler, etc.).

The electronic device may include at least one of a part of furniture, a building/structure or a car, an electronic board, an electronic signature receiving device, a projector or various metering devices (e.g., water, electricity, gas, radio wave metering devices and the like). The electronic device may be flexible, or be a combination of two or more of the aforementioned various devices. The electronic device, according to an embodiment of the present disclosure, is not limited to the aforementioned devices. In the present disclosure, the term 'user' may denote a person who uses the electronic device or a device (e.g., an artificial-intelligence electronic device) which uses the electronic device.

FIG. 1 is a block diagram of a network environment including an electronic device, according to an embodiment of the present disclosure.

Referring to FIG. 1, an electronic device 101 within a network environment 100 is described. The electronic device 101 includes a bus 110, a processor 120, a memory 130, an input output interface 150, a display 160, and a communication interface 170. The electronic device 101 may omit at least one of the elements or additionally have another element. The bus 110 may, for example, include a circuit coupling the elements 110, 120, 150, 160 and 170 with one another and forward communication (e.g., a control message or data) between the elements. The processor 120 may include one or more of a CPU, an AP or a communication processor (CP). The processor 120 may, for example, execute operations or data processing for control and/or communication of at least one another constituent element of the electronic device 101. The processor 120 may determine a value of SAR based on whether the user is adjacent to the electronic device 101 and whether an event has occurred. The processor 120 may determine an SAR average value. The processor 120 may determine a power limit reference value of the packet based on the SAR average value.

The memory 130 may include a volatile and/or non-volatile memory. The memory 130 may, for example, store a command or data related to at least one another constituent element of the electronic device 101. According to an embodiment of the present disclosure, the memory 130 may store software and/or a program 140. The memory 130 may store a plurality of SAR tables. The program 140 includes a kernel 141, a middleware 143, an application programming interface (API) 145, an application program (or application) 147, and the like. At least some of the kernel 141, the middleware 143 or the API 145 may be called an operating system (OS). The kernel 141 may, for example, control or manage system resources (e.g., bus 110, processor 120, memory 130, and the like) that are used for executing operations or functions implemented in other programs (e.g., middleware 143, API 145 or application 147). The kernel 141 may provide an interface through which the middleware 143, the API 145 or the application 147 may control or manage the system resources of the electronic device 101 by accessing the individual constituent elements of the electronic device 101.

The middleware 143 may enable the API 145 or the application 147 to communicate and exchange data with the kernel 141. The middleware 143 may process one or more work requests that are received from the application 147, in accordance with priority. The middleware 143 may grant priorities for using the system resources (e.g., the bus 110, the processor 120, the memory 130 and the like) of the electronic device 101 to at least one of the applications 147, and process one or more work requests. The API 145 is, for example, an interface enabling the application 147 to control a function provided by the kernel 141 or the middleware 143 and may, for example, include at least one interface or function (e.g., an instruction) for file control, window control, image processing, character control, and the like The input output interface 150 may forward a command or data input from a user or another external device, to another constituent element(s) of the electronic device 101, or output a command or data received from the other constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various content (e.g., a text, an image, a video, an icon, a symbol and/and the like) to a user. The display 160 may include a touch screen. The display 160 may receive a touch, gesture, proximity or hovering input that uses an electronic pen or a part of the user's body. The communication interface 170 may, for example, establish communication between the electronic device 101 and the first external electronic device 102, the second external electronic device 104 or the server 106. The communication interface 170 may be coupled to a network 162 through wireless communication or wired communication, to communicate with the second external electronic device 104 or the server 106.

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment of the present disclosure, the wireless communication may, for example, include at least one of wireless fidelity (Wi-Fi), Bluetooth™ (BT), Bluetooth™ low energy (BLE), Zigbee, near field communication (NFC), magnetic secure transmission (MST), radio frequency (RF) or body area network (BAN). The wireless communication may include GNSS. The GNSS may, for example, be a global positioning system (GPS), a global navigation satellite system (Glonass), a Beidou navigation satellite system (Beidou)) or Galileo, the European global satellite-based navigation system. Hereinafter, the term "GPS" may be used interchangeably with the term "GNSS". The wired communication may, for example, include at least one of a universal serial bus (USB), a high definition multimedia interface (HDMI), a recommended standard-232 (RS-232), power line communication (PLC), a plain old telephone service (POTS), and the like. The network 162 may include at least one of a telecommunications network, for example, a computer network (e.g., local area network (LAN) or wide area network (WAN)), the Internet or a telephone network.

Each of the first and second electronic devices 102 and 104 may be a device of the same or different type from that of the electronic device 101. According to an embodiment of the present disclosure, all or some of operations executed in the electronic device 101 may be executed in the electronic devices 102 and 104 or the server 106. In the case where the electronic device 101 performs some function or service automatically or in response to a request, the electronic device 101 may, instead of, or additionally, execute the function or service in itself, send a request for execution of at least a partial function associated with the function to electronic device 102, 104 or server 106. The electronic device 102, 104 or server 106 may execute the requested function or additional function, and forward the execution result to the electronic device 101. The electronic device 101 may process the received result as it is or additionally, to provide the requested function or service. A cloud computing, distributed computing or client-server computing technology may be used, for example.

Figure 2:
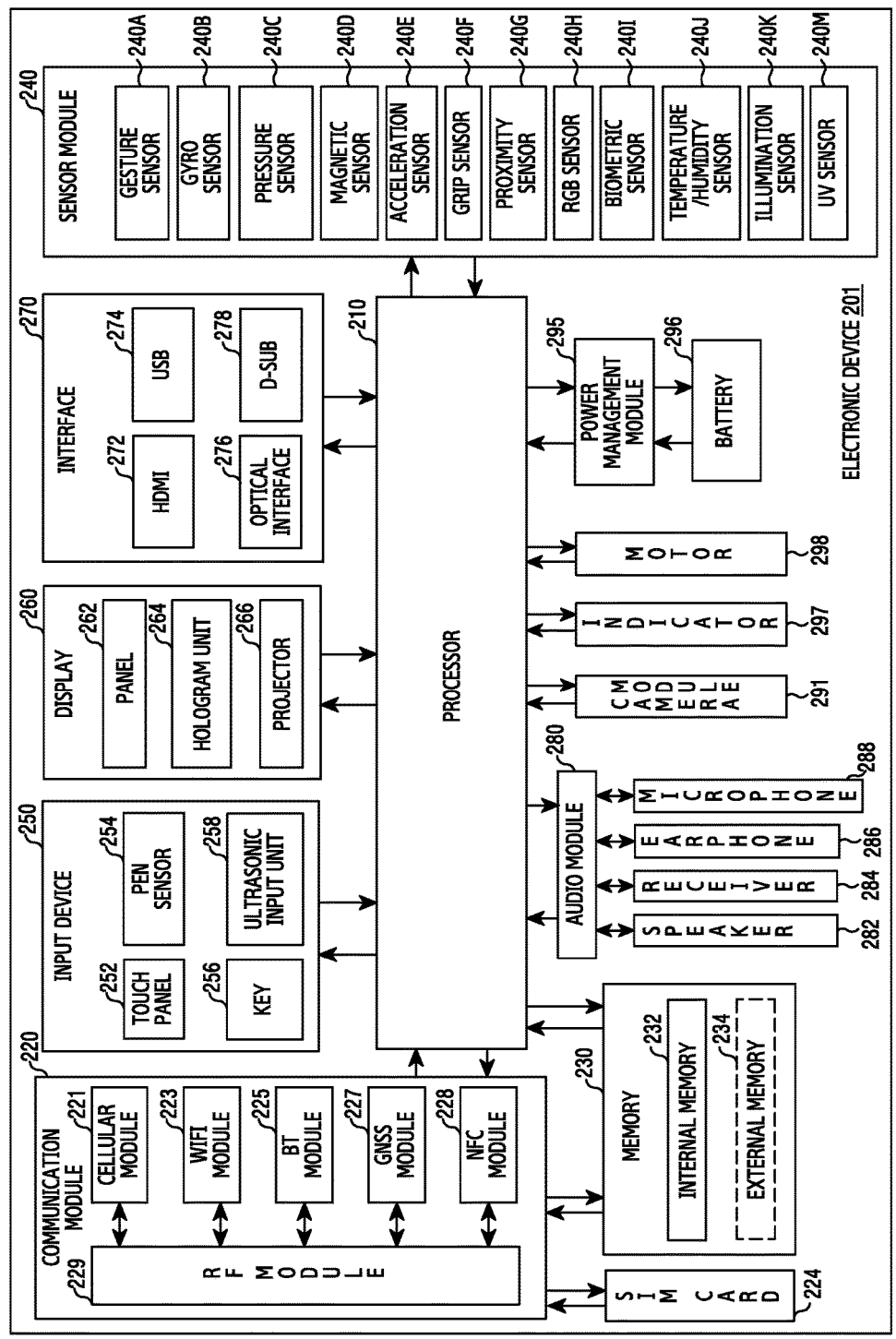
FIG. 2 illustrates a block diagram of an electronic device, according to an embodiment of the present disclosure.

FIG. 2 is a block diagram of an electronic device according to an embodiment of the present disclosure.

Referring to FIG. 2, an electronic device 201 may, for example, include the entire or part of the electronic device 101 illustrated in FIG. 1. The electronic device 201 includes one or more processors (e.g., APs) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an OS or an application program to control a majority of hardware or software constituent elements coupled to the processor 210, and may perform various data processing and operations. The processor 210 may be, for example, implemented as a system on chip (SoC). According to an embodiment of the present disclosure, the processor 210 may further include a graphics processing unit (GPU) and/or an image signal processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, process the loaded command or data, and store the result data in the non-volatile memory.

The communication module 220 may, for example, have the same or similar construction as the communication interface 170. The communication module 220 may, for example, include a cellular module 221, a Wi-Fi module 223, a BT module 225, a GNSS module 227, an NFC module 228, and a radio frequency (RF) module 229. The cellular module 221 may, for example, provide voice telephony, video telephony, a text service, an Internet service, and the like through a telecommunication network. According to an embodiment of the present disclosure, the cellular module 221 may perform authentication of the electronic device 201 within the telecommunication network, by using the subscriber identification module (SIM) card 224. The cellular module 221 may perform at least some functions among functions that the processor 210 may provide. The cellular module 221 may include a CP. At least some (e.g., two or more) of the cellular module 221, the Wi-Fi module 223, the BT module 225, the GNSS module 227 or the NFC module 228 may be included within one integrated chip (IC) or IC package. The RF module 229 may, transceive a communication signal (e.g., RF signal). The RF module 229 may, for example, include a transceiver, a power amplifier module (PAM), a frequency filter, a low noise amplifier (LNA), an antenna and the like. At least one of the cellular module 221, the Wi-Fi module 223, the BT module 225, the GNSS module 227 or the NFC module 228 may transceive an RF signal through a separate RF module. The subscriber identification module 224 may, for example, include a card and/or an embedded SIM. The subscriber identification module 224 may include unique identification information (e.g., integrated circuit card identifier (ICCID)) or subscriber information (e.g., international mobile subscriber identity (IMSI)).

The memory 230 includes an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) and the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF) drive, a secure digital (SD) memory card, a micro-SD memory card, a mini-SD memory card, an extreme digital (xD) memory card, a multi media card (MMC), a memory stick and the like. The external memory 234 may be operatively or physically coupled to the electronic device 201 through various interfaces.

The sensor module 240 may, for example, measure a physical quantity or sense an activation state of the electronic device 201, to convert measured or sensed information into an electrical signal. The sensor module 240 includes at least one of a gesture sensor 240A, a gyro sensor 240B, pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illuminance sensor 240K or an ultra violet (UV) light sensor 240M. Additionally or alternatively, the sensor module 240 may, for example, include an electronic-nose (E-nose) sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors therein. The electronic device 201 may further include a processor configured to control the sensor module 240 as a part of the processor 210 or separately, thereby controlling the sensor module 240 while the processor 210 is in a sleep state.

The input device 250 includes a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. The touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through microphone 288, to obtain data corresponding to the sensed ultrasonic wave.

The display 260 may include a panel 262, a hologram device 264, a projector 266, and/or a control circuit for controlling them. The panel 262 may be flexible, transparent, or wearable. The panel 262 may be constructed as one or more modules together with the touch panel 252. The hologram device 264 may show a three-dimensional image in the air using an interference of light. The projector 266 may project light onto a screen, to display an image. The screen may, for example, be located inside or outside the electronic device 201. The interface 270 may, for example, include an HDMI 272, a USB 274, an optical interface 276 or a D-subminiature (D-sub) connector 278. The interface 270 may, for example, be included in the communication interface 170 illustrated in FIG. 1. Additionally or alternatively, the interface 270 may, for example, include a mobile high-definition link (MHL) interface, an SD card/MMC interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is input or output through a speaker 282, a receiver 284, an earphone 286, the microphone 288, and the like. The camera module 291 is, for example, a device able to photograph a still image and a video. According to an embodiment of the present disclosure, the camera module 291 may include one or more image sensors (e.g., front sensor or rear sensor), a lens, an ISP or a flash (e.g., a LED, a xenon lamp and the like). The power management module 295 may, for example, manage the electric power of the electronic device 201. The power management module 295 may include a power management integrated circuit (PMIC), a charger IC or a battery gauge. The PMIC may, for example, employ a wired and/or wireless charging scheme. The wireless charging scheme may, for example, include a magnetic resonance scheme, a magnetic induction scheme, an electromagnetic wave scheme, and the like. The wireless charging scheme may further include a circuit for wireless charging, for example, a coil loop, a resonance circuit, a rectifier, and the like. The battery gauge may, for example, measure a charge level of the battery 296, a voltage, an electric current or a temperature. The battery 296 may, for example, include a rechargeable battery and/or a solar battery.

The indicator 297 may display a specific state, for example, a booting state, a message state, a charging state and the like of the electronic device 201 or a part (e.g., processor 210) of the electronic device 201. The motor 298 may convert an electrical signal into a mechanical vibration, and may generate a vibration, a haptic effect, and the like. The electronic device 201 may, for example, include a mobile TV support device (e.g., GPU) capable of processing media data according to the standards of digital multimedia broadcasting (DMB), digital video broadcasting (DVB), MediaFlo™ and the like. Each of the constituent elements described in the present disclosure may consist of one or more components, and a name of the corresponding constituent element may be varied according to the kind of electronic device. The electronic device 201 may omit some constituent elements, or further include additional constituent elements, or combine some of the constituent elements to configure one entity, but identically perform functions of corresponding constituent elements before combination.

Figure 3:
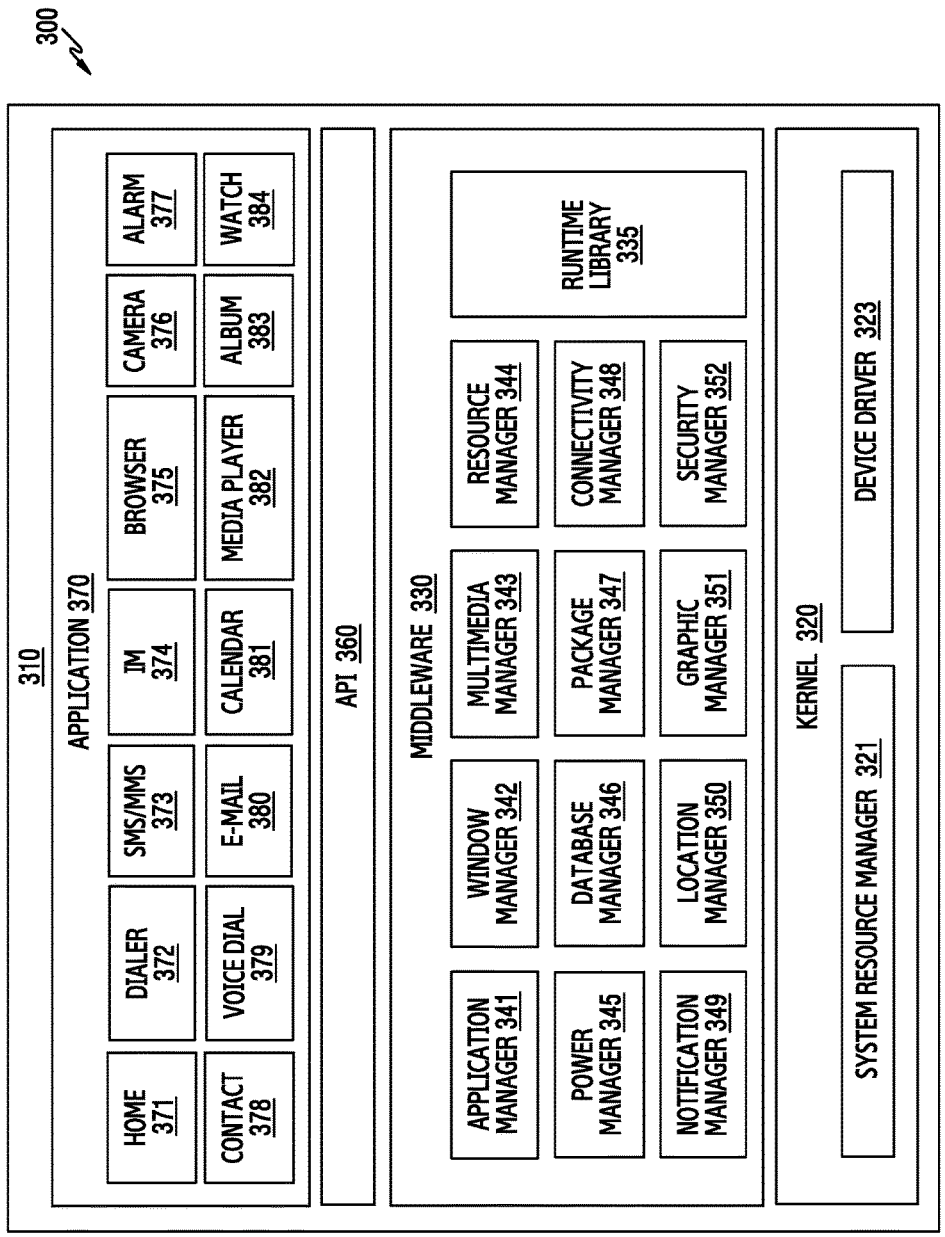
FIG. 3 illustrates a block diagram of a program module, according to an embodiment of the present disclosure.

FIG. 3 is a block diagram of a program module, according to an embodiment of the present disclosure.

Referring to FIG. 3, a program module 310 includes an OS for controlling resources related to the electronic device 101 and/or various applications (e.g., the application program 147) driven on the OS. The OS may, for example, include Android, iOS®, Windows®, Symbian®, Tizen® or Bada™. Referring to FIG. 3, the program module 310 includes a kernel 320, a middleware 330, an API 360, and/or an application 370. At least a part of the program module 310 may be preloaded onto an electronic device, or be downloaded from the electronic device 102, 104, the server 106.

The kernel 320 may, for example, include a system resource manager 321 and/or a device driver 323. The system resource manager 321 may perform control of a system resource, allocation thereof, recovery thereof and the like. According to an embodiment of the present disclosure, the system resource manager 321 may include a process management unit, a memory management unit or a file system management unit. The device driver 323 may, for example, include a display driver, a camera driver, a BT driver, a shared memory driver, a USB driver, a keypad driver, a Wi-Fi driver, an audio driver or an inter-process communication (IPC) driver. The middleware 330 may, for example, provide a function that the application 370 commonly needs, or provide various functions to the application 370 through the API 360 so that the application 370 may make use of restricted system resources within an electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 or a security manager 352.

The runtime library 335 may, for example, include a library module that a compiler uses to add a new function through a programming language while the application 370 is executed. The runtime library 335 may perform input and output management, memory management or arithmetic function processing. The application manager 341 may, for example, manage a lifecycle of the application 370. The window manager 342 may manage a graphical user interface (GUI) resource used by a screen. The multimedia manager 343 may detect a format required for playing media files, and perform encoding or decoding of the media file by using a codec suitable to the corresponding format. The resource manager 344 may manage a source code of the application 370 or a space of a memory. The power manager 345 may, for example, manage a battery capacity or a power supply, and provide power information required for an operation of an electronic device. The power manager 345 may interwork with a basic input/output system (BIOS). The database manager 346 may, for example, create, search or change a database that will be used by the application 370. The package manager 347 may manage installation or updating of an application that is distributed in a form of a package file.

The connectivity manager 348 may, for example, manage wireless connectivity. The notification manager 349 may, for example, provide events such as an arrival message, an appointment, a proximity notification, etc. to a user. The location manager 350 may, for example, manage location information of an electronic device. The graphic manager 351 may, for example, manage a graphic effect that will be provided to a user, or a user interface. The security manager 352 may, for example, provide system security or user authentication. The middleware 330 may include a telephony manager for managing a voice or video telephony function of an electronic device, or a middleware module capable of forming a combination of functions of the aforementioned constituent elements. The middleware 330 may provide a module that is specialized based on the type of OS. The middleware 330 may dynamically delete some of the existing constituent elements or add new constituent elements. The API 360 is, for example, a set of API programming functions, and may be provided to have another construction in accordance with the OS. For example, Android® or iOS® may provide one API set by platform, and Tizen may provide two or more API sets by platform.

The application 370 may, for example, include a home application 371, a dialer application 372, a short message service (SMS)/multimedia messaging service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a watch application 384, health care application (e.g., measuring a blood sugar level and the like), or an environmental information (e.g., air pressure, humidity or temperature information) application. According to an embodiment of the present disclosure, the application 370 may include an information exchange application that may support information exchange between an electronic device and an external electronic device. The information exchange application may, for example, include a notification relay application for relaying specific information to the external electronic device, or a device management application for managing the external electronic device. The notification relay application may relay notification information generated by another application of an electronic device to an external electronic device, or receive notification information from the external electronic device to provide the received notification information to a user. The device management application may, for example, install, delete or update a function (e.g., turn-on/turn-off of the external electronic device itself (or some constituent components) or adjustment of a brightness (or resolution) of a display) of the external electronic device that communicates with the electronic device, or an application operating in the external electronic device. The application 370 may include an application (e.g., a health care application of a mobile medical instrument) designated according to an attribute of the external electronic device. The application 370 may include an application received from the external electronic device. At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

The electronic device 201 may be used for transmitting an uplink signal. The electronic device 201 may be required to prevent an output power decrease by backing-off the power limit reference value when transmission of an uplink signal is to be maintained. If the electronic device 201 continuously executes the application 370 for uploading data, the output may be degraded due to the back-off of the power limit reference value. The electronic device 201 may adaptively measure the SAR value for each application 370 being executed to prevent the output degradation.

The term "module" as used in the present disclosure may include a unit consisting of hardware, software or firmware and, for example, may be used interchangeably with the terms "logic", "logic block", "component", "circuit" and the like. The "module" may be an integrally configured component or the minimum unit performing one or more functions or a part thereof. The "module" may be implemented mechanically or electronically and, for example, may include an application-specific integrated circuit (ASIC) chip, field-programmable gate arrays (FPGAs) or a programmable logic device, which has been known or will be developed in the future, performing some operations. At least a part of an apparatus (e.g., modules or functions thereof) or method (e.g., operations) according to an embodiment of the present disclosure may, for example, be implemented by an instruction that is stored in a computer-readable storage media in the form of a program module. In the case where the instruction is executed by the processor 120, the processor 120 may perform a function corresponding to the instruction. The computer-readable storage media may include a hard disk, a floppy disk, a magnetic media (e.g., a magnetic tape), an optical recording media (e.g., a compact disc-read only memory (CD-ROM) or a DVD), a magneto-optical media (e.g., a floptical disk), an internal memory, etc. The instruction may include code that is made by a compiler or code that is executed by an interpreter. The module or program module may include at least one or more of the aforementioned constituent elements, or omit some, or further include another constituent element. Operations carried out by the module, the program module or the another constituent element may be executed in a sequential, parallel, repeated or heuristic manner, or at least some operations may be executed in different order or be omitted, or another operation may be added.

Figure 4:
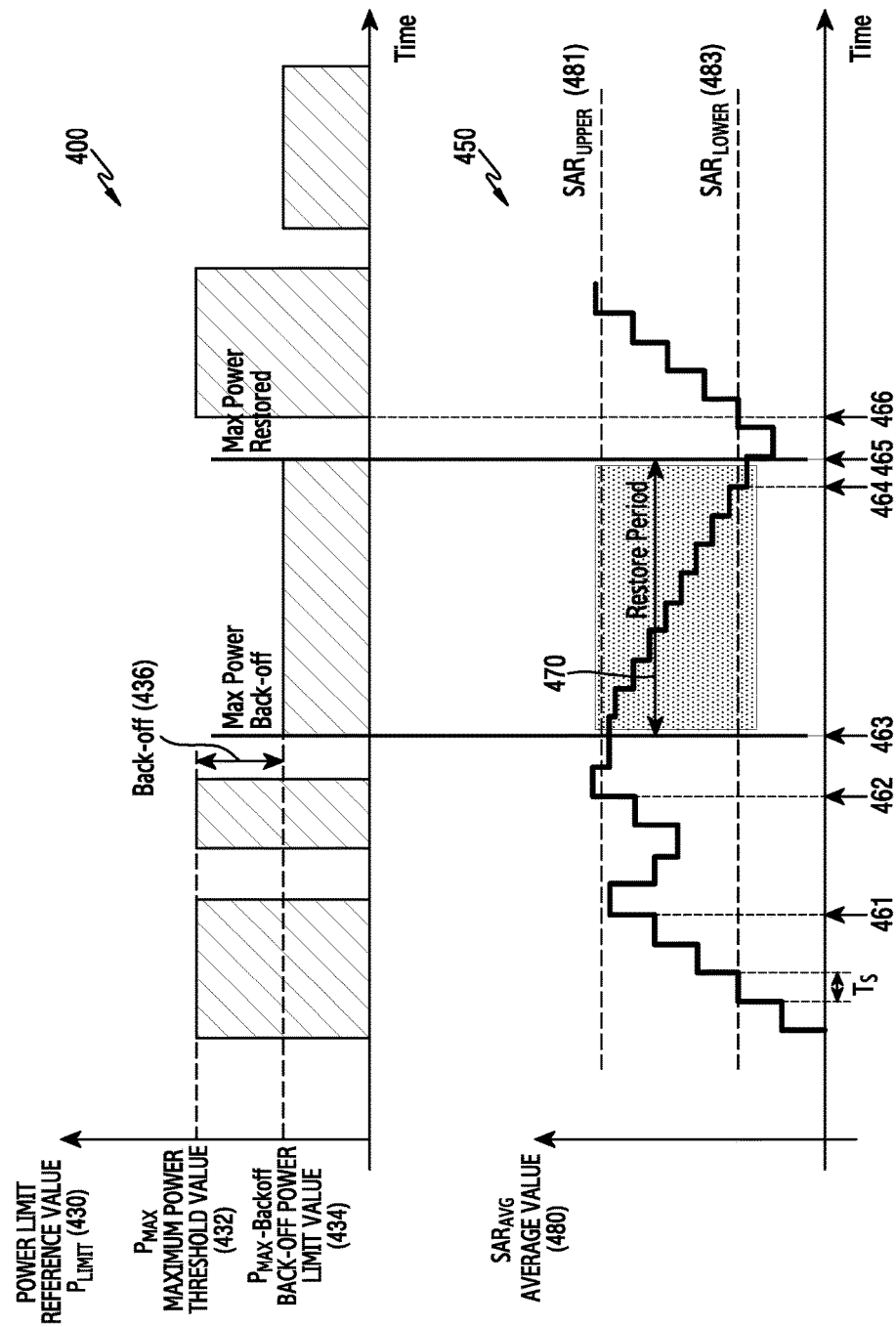
FIG. 4 illustrates a relationship between an average value of SAR and a power limit reference value, according to an embodiment of the present disclosure.

FIG. 4 illustrates a relationship between an average value of SAR and a power limit reference value according to an embodiment of the present disclosure.

Referring to FIG. 4, the terms required for explaining an embodiment of the present disclosure are defined herein. In the following description, the term denoting control information, the term denoting a multiple-antenna signal processing scheme, the term denoting a status change (e.g., the expiration of a specific interval and an event), the term denoting a transmit signal, the terms denoting network entities, the terms denoting messages (e.g., a request and a packet), the term denoting a constituent element of an apparatus, etc. are provided for description convenience. Accordingly, the present disclosure is not limited to the terms described herein, and may use other terms having equivalent technological meanings.

Referring to FIG. 4, a graph 400 represents a variation of a power limit reference value ($P_{LIMIT}$) over time. A horizontal axis of the graph 400 represents time, and a vertical axis of the graph 400 represents the power limit reference value 430. A graph 450 represents a variation of an average value of SAR ($SAR_{AVG}$) over time. A horizontal axis of the graph 450 represents time, and a vertical axis of the graph 450 represents the average value of SAR 480.

For communication with a base station, the electronic device 201 of FIG. 2 may radiate an electromagnetic wave. A part of the electromagnetic wave radiated from the electronic device 201 may be received by a user of the electronic device 201. A rate in which the radiated electromagnetic wave is absorbed by biological tissue of the user is denoted as a SAR. In a manufacturing step, the electronic device 201 may be designed to adjust the power limit reference value 430 such that the intensity of the radiated electromagnetic wave does not harm the human body of the user. For example, if a value of SAR of the electromagnetic wave radiated from the electronic device 201 is greater than or equal to a certain threshold value, the electronic device 201 may control the power limit reference value 430 as a lower value.

To determine the value of SAR of the radiated electromagnetic wave, the electronic device 201 may measure the power of the electronic device 101 every designated time interval. The designated time interval may be a minimum unit of time for measuring power. The designated time interval may be denoted as an interval unit. The designated time interval, a time interval for measuring power, may be denoted as a sensing cycle as well. The interval unit may have various values in accordance with a communication scheme of the electronic device 201. For example, in the case where the electronic device 201 supports a LTE communication system, the interval unit may be 1 millisecond (ms). For another example, in the case where the electronic device 201 supports a 3rd-generation (3G) communication system, the interval unit may be 667 microseconds ($\mu$s).

The electronic device 201 may measure a value of power every interval unit. Based on the value of power measured every interval unit, the electronic device 201 may determine an average value of power for a specific interval. The specific interval may be denoted as an average interval. The specific interval may be denoted as an average time as well. The specific interval may be denoted as an average window as well. The average time may correspond to 6 minutes. The electronic device 201 may determine the average value of power as the average value of SAR 480. The electronic device 201 may determine a value of SAR corresponding to the value of power that is measured every interval unit, and determine the average value of SAR 480 for the average interval based on the value of SAR as well.

In the case where the average value of SAR 480 is less than or equal to an upper limit threshold value 481 ($SAR_{UPPER}$), the electronic device 201 may set the power limit reference value 430 as a maximum power threshold value ($P_{MAX}$) 432. The power limit reference value 430 may be a value that is set as a limit value of power output from the electronic device 201. The maximum power threshold value 432 may be a maximum value of power the electronic device 201 may output.

The electronic device 201 may measure the average value of SAR 480 at time point 461. The electronic device 201 may identify that at time point 461, the average value of SAR 480 does not exceed the upper limit threshold value

481. The electronic device 201 may not change the power limit reference value 430. The power limit reference value 430 may be sustained as the maximum power threshold value 432.

In the case where the average value of SAR 480 exceeds the upper limit threshold value 481, the electronic device 201 may determine the power limit reference value 430. The power limit reference value 430 may be determined as a value obtained by subtracting a back-off value 436 from the maximum power threshold value 432. The back-off value 436 subtracted from the maximum power threshold value 432 may be a back-off power limit value 434 ($P_{MAX}$-Backoff).

The electronic device 201 may determine whether the average value of SAR 480 exceeds the upper limit threshold value 481 at time point 462. If the electronic device 201 determines that the average value of SAR 480 exceeds the upper limit threshold value 481 at time point 462, the electronic device 201 may change the power limit reference value 430. At time point 463 corresponding to a next transmission time point, the electronic device 201 may change the power limit reference value 430 from the maximum power threshold value 432 to the back-off power limit value 434.

The electronic device 201 may transmit an uplink signal, in a state in which the power limit reference value 430 has been set as the back-off power limit value 434. In detail, during the interval (e.g., from time point 463 to time point 465) for transmitting an uplink signal, the electronic device 201 may transmit the uplink signal, in the state in which the power limit reference value 430 has been set as the back-off power limit value 434. A period of time from time point 463 to time point 465 may be denoted as a restore period 470. Time point 463 may be denoted as a back-off time point. The restore period 470 may be determined differently according to a determined hysteresis quantity. The hysteresis quantity may be determined based on the upper limit threshold value ($SAR_{UPPER}$) 481 and a lower limit threshold value ($SAR_{LOWER}$) 483.

The electronic device 201 may determine a value of SAR corresponding to a value of power measured every interval unit, at the restore period 470. Based on the value of SAR, the electronic device 201 may determine the average value of SAR 480 for an average interval. If the average value of SAR 480 is less than the lower limit threshold value 483, the electronic device 201 may change the power limit reference value 430. The electronic device 201 may change the power limit reference value 430 from the back-off power limit value 434 to the maximum power threshold value 432. In detail, the electronic device 201 may determine that the average value of SAR 480 is less than the lower limit threshold value 483 at time point 464. Thereafter, the electronic device 201 may change the power limit reference value 430 from the back-off power limit value 434 to the maximum power threshold value 432. At time point 466 corresponding to a next transmission initiation time point, the electronic device 201 may transmit packets, based on the power limit reference value 430 determined as the maximum power threshold value 432.

Based on the measured average value of SAR 480, the electronic device 201 may lower the power limit reference value 430 to the back-off power limit value 434, or sustain the power limit reference value 430 as the maximum power threshold value 432.

If the power limit reference value 430 of the electronic device 201 is lowered, a value of output power of the electronic device 201 is lowered so the electronic device 201 transmit packets within the low output power. Accordingly, while transmitting the packets at the relatively low output power, the electronic device 201 may obtain a relatively low transmission speed. Accordingly, the electronic device 201 may be required to delay a time point of decreasing the power limit reference value 430 or prevent the same. To delay time point 463 that is a back-off time point, the electronic device 201 may be required to measure the average value of SAR 480 as a more accurate value.

During the restore period 470, as the power limit reference value 430 is law, a transmission success rate may decrease if a packet is transmitted. Accordingly, to shorten the restore period 470, the electronic device 201 may be required to measure the average value of SAR 480 as a more accurate value.

Figure 5:
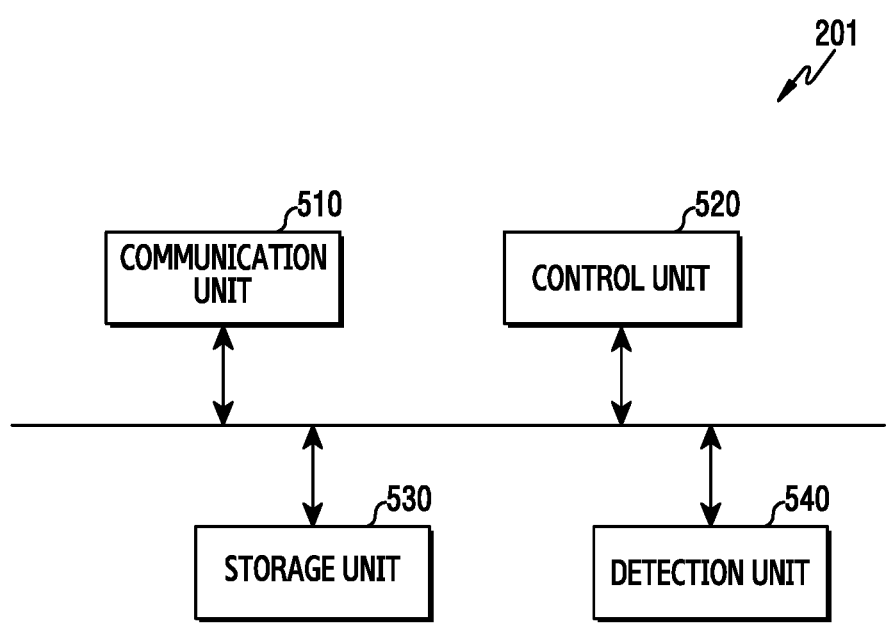
FIG. 5 illustrates a block diagram of a functional configuration of an electronic device, according to an embodiment of the present disclosure.

FIG. 5 illustrates a block diagram of a functional configuration of an electronic device, according to an embodiment of the present disclosure.

The terms 'control unit', 'processor', etc. used below represent the unit of processing at least one function or operation. These functions or operations may be implemented by hardware, software or a combination of hardware and software.

In an embodiment of the present disclosure, the electronic device 201 may be a portable electronic device, and may be one of a smartphone, a portable terminal, a mobile phone, a mobile pad, a media player, a tablet computer, a handheld computer or a PDA. The electronic device 201 may be a device that combines functions of two or more of the aforementioned devices.

Referring to FIG. 5, the electronic device 201, according to an embodiment of the present disclosure, includes a communication unit (or a communication module, or communication device) 510, a control unit (or a processor) 520, a storage unit 530 and a detection unit (or a detection module) 540. The communication unit 510, the control unit 520, the storage unit 530 and the detection unit 540 may be operatively coupled to one another.

The communication unit (e.g. communication device) 510 may perform functions for transmitting or receiving a signal through a wireless channel. The communication unit 510 may include the communication module 220 of FIG. 2.

The communication unit 510 may perform a function of conversion between a baseband signal and a bit stream in compliance with the physical layer standards of a system. For example, in the case of transmitting data, the communication unit 510 may encode and modulate a transmission bit stream, thereby generating complex symbols. For another example, in the case of receiving data, the communication unit 510 may demodulate and decode a baseband signal, thereby restoring the same to a reception bit stream.

The communication unit 510 may up convert a baseband signal into an RF band signal and transmit the same through an antenna. The communication unit 510 may down convert an RF band signal received through the antenna, into a baseband signal. The communication unit 510 may include a transmission filter, a reception filter, an amplifier, a mixer, an oscillator, a digital analog converter (DAC), an analog digital converter (ADC), etc. The communication unit 510 may include at least one transceiver.

The communication unit 510 may further include a modulator/demodulator (modem). The communication unit 510 may determine the number of packets that are transmitted through the modem. The communication unit 510 may determine the number of ACKnowledgements (ACKs) that correspond to the packets transmitted through the modem. The communication unit 510 may generate a request message notifying that there is a request for transmitting packets through the modem. The communication unit 510 may forward the number of the transmitted packets to the control unit 520. The communication unit 510 may forward, to the control unit 520, the number of ACKs that correspond to the transmitted packets. The communication unit 510 may forward the request message to the control unit 520.

The communication unit 510 may acquire a power limit reference value from the control unit 520. The power limit reference value may be the power limit reference value 430 of FIG. 4. The communication unit 510 may transmit packets based on the acquired power limit reference value 430. For example, in case where the power limit reference value 430 is the maximum power threshold value 432, the communication unit 510 may transmit packets at a power level that does not exceed the maximum power threshold value 432.

The control unit 520 may control general operations of the electronic device 201. The control unit 520 may include the processor 210 of FIG. 2. The control unit 520 may include a CP that performs control related to communication. The control unit 520 may include an AP that controls an application program and an upper software layer as well.

The control unit 520 may determine a SAR table among a plurality of SAR tables, based on at least one of a distance between the electronic device 201 and a user of the electronic device 201 and a state of the electronic device 201. The plurality of SAR tables may include SAR tables corresponding to distance levels. The distance between the electronic device 201 and the user may correspond to one of the distance levels. The plurality of SAR tables may include at least one SAR table that corresponds to at least one designated state. The state of the electronic device 201 may be one of the at least one designated state. The control unit 520 may first determine the state of the electronic device 201 and determine the SAR table among the plurality of SAR tables based on the determined state and the distance between the electronic device 201 and the user. The plurality of SAR tables may include the SAR tables that are determined according to the distance levels and the at least one designated state. The plurality of SAR tables may be stored in the storage unit 530.

Based on the determined SAR table, the control unit 520 may determine a value of SAR. The control unit 520 may acquire a value of power of the electronic device 201. Based on the acquired value of power, the control unit 520 may determine the value of SAR. The control unit 520 may determine the value of SAR corresponding to the acquired value of power, using the determined SAR table.

Based on the determined value of SAR, the control unit 520 may determine an average value of SAR. The control unit 520 may compare the average value of SAR and a threshold value.

Based on the comparison result of the average value of SAR and the threshold value, the control unit 520 may control power. Based on the comparison result of the average value of SAR and the threshold value, the control unit 520 may determine back-off of the power. Based on the comparison result of the average value of SAR and the threshold value, the control unit 520 may determine whether to change a transmission cycle of a signal.

To determine whether to change the transmission cycle of the signal, the control unit 520 may determine a transmission success rate of packets. In the case where the transmission success rate of packets is less than or equal to a constant threshold value, the control unit 520 may determine to set the transmission cycle greater than a reference cycle. The reference cycle may be a transmission cycle of if packets are transmitted whenever there is a request for transmitting of the packets. A value of the reference cycle may be set as 1.

When failing to get a transmission success rate greater than a designated value when setting the transmission cycle of packets greater than the reference cycle, the control unit 520 may determine a transmission cycle of the next transmitting packets as the reference cycle.

The storage unit 530 may store a control instruction code controlling the electronic device 201, control data, or user data. The storage unit 530 may include the memory 230 of FIG. 2.

The storage unit 530 may store at least one SAR table. In an embodiment of the present disclosure, an example of a SAR table is disclosed with reference to Table 1 and Table 2 described later. The storage unit 530 may store a plurality of SAR table sets. The plurality of SAR table sets may be SAR table sets corresponding to a plurality of events. The plurality of events may be previously designated events. The storage unit 530 may store information about the designated events as well. The storage unit 530 may store an algorithm for generating a SAR table as well. Based on the algorithm, the control unit 520 may generate the SAR table. The algorithm may be an algorithm that uses, as an input variable, at least one of a distance between the user of the electronic device 201 and a state of the electronic device 201.

The storage unit 530 may include information about packets. The information about the packets may include at least one of the number of packets intended for transmitting, the number of ACKs corresponding to successfully transmitted packets, a message related to a request for transmitting of packets, and a transmission success rate of packets.

The storage unit 530 may store values of SAR. The storage unit 530 may store the values of SAR in a first in first out (FIFO) structure. The FIFO structure may a circular FIFO structure. The FIFO structure may include a first array and a second array.

In the first array, the storage unit 530 may store a value of SAR corresponding to an interval unit, in order to determine an average value of SAR. The interval unit may be the unit of time for measuring the power of the electronic device 201 in order to determine the value of SAR. The interval unit may be a minimum sensing cycle that is determined according to a communication scheme of the electronic device 201. In the first array, the storage unit 530 may store a plurality of SAR values corresponding to a plurality of interval units respectively, in order to determine the average value of SAR. Based on a size of the first array, the storage unit 530 may store the plurality of SAR values. If the first array has ten SAR value storage spaces, the storage unit 530 may store the plurality of SAR values up to ten. A time interval for filling the first array may be denoted as a buffer interval.

In the second array, the storage unit 530 may store an average value of a plurality of SAR values stored in the first array, in order to determine an average value of SAR. The average value of the plurality of SAR values may be denoted as a SAR buffer value for a buffer interval. In the case where the average value of the plurality of SAR values stored in the first array has been stored in the second array, the storage unit 530 may delete the plurality of SAR values stored in the first array. The storage unit 530 may repeatedly store, in the second array, a plurality of buffer values of SAR for a plurality of buffer intervals. If there is no remaining storage space in the second array, the storage unit 530 may delete the first filled SAR buffer value, and add a new SAR buffer value. That is, the storage unit 530 may store buffer values of SAR in a circulating structure, to update an average value of the buffer values of SAR. The average value may be the average value of SAR 480 of FIG. 4.

The storage unit 530 may store values of SAR for an average interval. The average interval may be determined based on a size of the first array and a size of the second array.

The storage unit 530 may store information about power. The information about the power may include at least one of the power limit reference value 430, the maximum power threshold value 432, the back-off power limit value 434, the back-off value 436, the upper limit threshold value 481, and the lower limit threshold value 483 of FIG. 4.

The detection unit 540 may detect information about an input to the electronic device 201, a state change thereof, and a periphery thereof. The detection unit 540 may include the sensor module 240, the input device 250 and the interface 270 of FIG. 2.

In an embodiment of the present disclosure, the detection unit 540 may detect information related to a distance between a user of the electronic device 201 and the electronic device 201 such that it may determine whether the user is adjacent to the electronic device 201. The detection unit 540 may detect if the user is gripping the electronic device 201 through the grip sensor 240F. The grip or non-grip may indicate whether the user is adjacent to the electronic device 201. The detection unit 540 may detect the distance between the user and the electronic device 201 through the proximity sensor 240G The distance may indicate how adjacent the user is to the electronic device 201. The detection unit 540 may detect brightness information through the illuminance sensor 240K. The brightness information may indicate whether the user is adjacent to the electronic device 201.

In an embodiment of the present disclosure, the detection unit 540 may detect a specific event in order to determine a state of the electronic device 201. The event may be an event that affects the state of the electronic device 201. The event may be an event that affects a magnetic field state of the electronic device 201. The event may be an operation in which the electronic device 201 turns on or off a module related to short range communication. The module related to short range communication may be the BT module 225 or the NFC communication module 228. The module related to the short range communication may control a variety of wireless signals. The variety of wireless signals may cause a change in a magnetic field between the electronic device 201 and the user. The event may be a situation in which the user inserts the earphone 286 of the electronic device 201 into an earphone jack or detaches the same from the earphone jack. The earphone 286 may include a cable in which electric current flows and speaker and microphone. The cable, speaker and microphone may cause a change in the magnetic field between the electronic device 201 and the user. The event may be a motion in which a case is mounted on the electronic device 201. The case may operate as a Hall effect integrated chip for the electronic device 201. The case may induce a Hall effect for the electronic device 201. The event may be a motion in which an external device is connected to the electronic device 201. The external device may include a PC, a TV, a printer, a USB storage device, a charger, etc.

Figure 6:
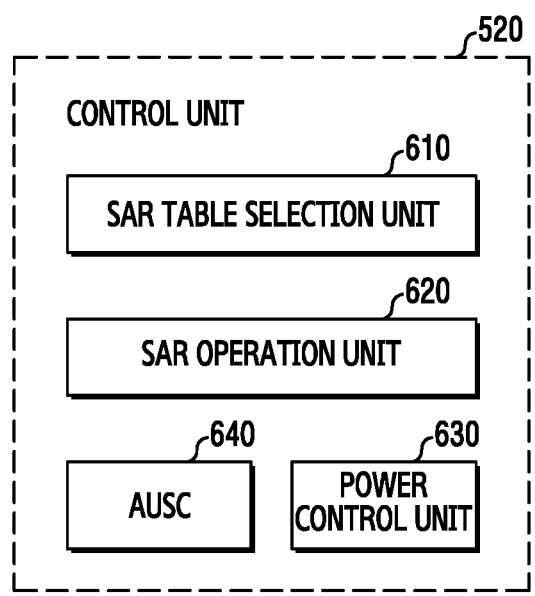
FIG. 6 illustrates a block diagram of a functional configuration of a control unit, according to an embodiment of the present disclosure.

FIG. 6 illustrates a block diagram of a functional configuration of a control unit, according to an embodiment of the present disclosure.

Referring to FIG. 6, the control unit 520 includes a SAR table selection unit 610, a SAR operation unit 620, a power control unit 630, and an AUSC 640. The control unit 520 may be denoted as a smart time average SAR engine (STASE).

Based on at least one of a distance between the electronic device 201 and a user and a state of the electronic device 201, the SAR table selection unit 610 may determine a SAR table among a plurality of SAR tables. In an embodiment of the present disclosure, to determine the SAR table, the SAR table selection unit 610 may determine if the user of the electronic device 201 is adjacent to the electronic device 201. Based on information acquired from the detection unit 540, the SAR table selection unit 610 may determine if the user is adjacent to the electronic device 201. Based on distance information acquired through the proximity sensor 240G of FIG. 2, the SAR table selection unit 610 may determine if the user is adjacent to the electronic device 201. Based on brightness information acquired through the illuminance sensor 240K, the SAR table selection unit 610 may determine if the user is adjacent to the electronic device 201.

In an embodiment of the present disclosure, to determine a SAR table, the SAR table selection unit 610 may determine a state of the electronic device 201. Based on information acquired from the detection unit 540, the SAR table selection unit 610 may determine the state of the electronic device 201. Based on peripheral information acquired from the sensor module 240, the SAR table selection unit 610 may determine the state of the electronic device 201. Based on information about external device connection acquired from the interface module 270 of FIG. 2, the SAR table selection unit 610 may determine the state of the electronic device 201.

The SAR table selection unit 610, according to an embodiment of the present disclosure, may determine, as a parameter for table selection, at least one of a distance between the user of the electronic device 201 and a state of the electronic device 201. The SAR table selection unit 610 may determine a SAR table corresponding to the parameter. The SAR table selection unit 610 may determine, through a search, the SAR table corresponding to the parameter among a plurality of SAR tables stored in the storage unit 530 of FIG. 5. The SAR table selection unit 610 may determine the SAR table using an algorithm stored in the storage unit 530 of FIG. 5 and the parameter.

The SAR table selection unit 610 may first determine a state of the electronic device 201, and determine a SAR table based on the determined state and a distance between the electronic device 201 and the user.

The SAR table selection unit 610 may first determine a state of the electronic device 201. The SAR table selection unit 610 may determine if the state of the electronic device 201 is a designated state. The SAR table selection unit 610 may acquire information about the designated state from the storage unit 530. If the state of the electronic device 201 is a previously designated state, the SAR table selection unit 610 may determine a SAR table set corresponding to the state of the electronic device 201. The SAR table selection unit 610 may acquire information about the SAR table set from the storage unit 530. The SAR table set may include a plurality of SAR tables.

Based on a distance between the electronic device 201 and the user, the SAR table selection unit 610 may determine a SAR table among a SAR table set. The SAR table selection unit 610 may determine a distance level corresponding to the distance between the electronic device 201 and the user. The SAR table set may include a plurality of SAR tables corresponding to a plurality of distance levels. The plurality of distance levels may be distinguished according to the distance between the electronic device 201 and the user. The SAR table selection unit 610 may determine a SAR table corresponding to the determined distance level, among the SAR table set. Based on the distance between the electronic device 201 and the user, the SAR table selection unit 610 may determine if the user is adjacent to the electronic device 201. The SAR table set may include at least two SAR tables. The two SAR tables may include a near SAR table and a remote SAR table. If the SAR table selection unit 610 determines that the user is adjacent to the electronic device 201, the SAR table selection unit 610 may determine the near SAR table among the two SAR tables. If the SAR table selection unit 610 determines that the user is not adjacent to the electronic device 201, the SAR table selection unit 610 may determine the remote SAR table among the two SAR tables.

Based on the determined SAR table, the SAR operation unit 620 may determine a value of SAR. The value of SAR may be a value of SAR for an interval unit. The interval unit may be the unit of time for measuring power. The interval unit may have various values in accordance with a communication scheme of the electronic device 201. For example, in the case where the electronic device 201 supports an LTE communication system, the interval unit may be 1 ms.

The SAR operation unit 620 may acquire a value of power of the electronic device 201. The SAR operation unit 620 may determine a value of SAR corresponding to the acquired value of power of the electronic device 201, among the determined SAR table. The SAR table may include pairs of values of power of the electronic device 201 and values of SAR corresponding to the values of power.

The conventional electronic device determines a value of power of the electronic device as a value of SAR, in consideration of an available maximum value of SAR. In an embodiment of the present disclosure, the SAR operation unit 620 of the electronic device 201 may determine an average value of SAR of which a history has been accumulated, using information of all events able to affect a value of SAR of the electronic device 201. The electronic device 201 may measure a more accurate value of SAR and acquire a lower average value of SAR than the conventional technique, thereby enhancing a transmission success rate. By acquiring the lower average value of SAR, the electronic device 201 may delay a time point at which power back-off takes place. By acquiring the lower average value of SAR, the electronic device 201 may shorten a restore period. By acquiring a more accurate average value of SAR, the electronic device 201 may solve a problem in which frequent power back-off results in the restriction of the coverage of the electronic device 201 due to a weak electric field.

The SAR operation unit 620 may compare the determined average value of SAR with a threshold value, to generate the comparison result. The average value of SAR may be the average value of SAR 480 of FIG. 4. In an embodiment of the present disclosure, the SAR operation unit 620 may compare the average value of SAR with an upper limit threshold value. The upper limit threshold value may be the upper limit threshold value 481 of FIG. 4. The SAR operation unit 620 may compare the average value of SAR with a lower limit threshold value. The lower limit threshold value may be the lower limit threshold value 483 of FIG. 4. The SAR operation unit 620 may generate the comparison result. The comparison result may indicate one of three pieces of information. The three pieces of information may include first information, second information, and 3rd information. The first information indicates that the average value of SAR 480 exceeds the upper limit threshold value 481. The second information indicates that the average value of SAR 480 is greater than the lower limit threshold value 483 and is less than or equal to the upper limit threshold value 481. The 3rd information indicates that the average value of SAR 480 is less than or equal to the lower limit threshold value 483. The SAR operation unit 620 may forward the comparison result to the power control unit 630. The SAR operation unit 620 may forward the comparison result to the AUSC 640 as well.

Based on the comparison result (e.g., the first information, the second information and the 3rd information) between the average value of SAR 480 and the threshold value, the power control unit 630 may control power. In an embodiment of the present disclosure, the power control unit 630 may determine whether to back off a power limit reference value based on the comparison result. The power limit reference value may be the power limit reference value 430 of FIG. 4. That is, the power control unit 630 may determine whether to determine the power limit reference value 430 as the maximum power threshold value 432, or whether to determine the power limit reference value 430 as the back-off power limit value 434 being a value less than the maximum power threshold value 432. If the comparison result includes the first information, the power control unit 630 may determine whether to back off based on a current power limit reference value 430. If the current power limit reference value 430 is the maximum power threshold value 432, the power control unit 630 may determine the back-off of the current power limit reference value 430 in order to lower the average value of SAR 480.

If the power control unit 630 determines the back-off of the power limit reference value 430, the power control unit 630 may determine the back-off value 436. In an embodiment of the present disclosure, the power control unit 630 may individually determine the back-off value 436 in accordance with the kind of event that is detected in the detection unit 540 of FIG. 5. If an event of connecting an earphone to the electronic device 201 is detected in the detection unit 540, the power control unit 630 may determine the back-off value 436 as 10 decibel (dB). If an event of connecting a charger to the electronic device 201 is detected in the detection unit 540, the power control unit 630 may determine the back-off value 436 as 5 dB. The power control unit 630 may determine the back-off value 436, in accordance with a distance between the user and the electronic device 201 detected in the detection unit 540. If the detection unit 540 detects the distance between the user and the electronic device 201 as a value greater than 20 mm, the power control unit 630 may determine the back-off value 436 as 1 dB. If the detection unit 540 detects the distance between the user and the electronic device 201 as a value less than 5 mm, the power control unit 630 may determine the back-off value 436 as 3 dB.

In an embodiment of the present disclosure, if the power control unit 630 determines that back-off should be required, the power control unit 630 may generate indication information. The indication information may include information representing the determined back-off value 436. The power control unit 630 may forward the indication information to the AUSC 640. Based on the indication information, the AUSC 640 may determine a transmission cycle. Based on the transmission cycle, the AUSC 640 may determine the power limit reference value 430. The power control unit 630 may obtain the power limit reference value 430 from the AUSC 640.

The power control unit 630 may determine the power limit reference value 430. In an embodiment of the present disclosure, the power control unit 630 may determine the power limit reference value 430 in accordance with the back-off value 436 that is determined in the power control unit 630. Based on a value acquired from the AUSC 640, the power control unit 630 may determine the power limit reference value 430. The power limit reference value 430 may indicate an upper limit value of power the electronic device 201 may use if packets are transmitted. The power control unit 630 may forward the determined power limit reference value 430 to the communication unit 510 of FIG. 5.

Based on the comparison result between the average value of SAR 480 and the threshold value, the AUSC 640 may determine whether to change a transmission cycle of packets. In an embodiment of the present disclosure, based on the comparison result, the AUSC 640 may determine whether the back-off of power of the electronic device 201 is required. The AUSC 640 may obtain, from the power control unit 630, information indicating whether the back-off is required. If the AUSC 640 determines that the back-off of the power is required, the AUSC 640 may determine whether to change the transmission cycle of packets.

To determine whether to change the transmission cycle of packets, the AUSC 640 may determine a transmission success rate of packets. In an embodiment of the present disclosure, the AUSC 640 may acquire the number of transmitted packets from the communication unit 510 of FIG. 5. The AUSC 640 may acquire the number of ACKs corresponding to the transmitted packets, from the communication unit 510. Based on the acquired number of transmitted packets and number of ACKs, the AUSC 640 may determine the transmission success rate of packets. The AUSC 640 may determine the transmission success rate of packets based on Equation (1) below.

$$TX\ Success_{Ratio} = \frac{N_{ACK}}{N_{SEND}} \quad (1)$$

Here, the TX Success$_{Ratio}$ refers to a transmission success rate of packets, and the $N_{SEND}$ refers to the number of transmitted packets, and the $N_{ACK}$ refers the number of ACKs on the packets.

The transmission success rate may be determined based on at least one of a block error rate (BLER), a bit error ratio and a bit error rate.

If the transmission success rate of packets is less than or equal to a constant threshold value, the AUSC 640 may determine to change a transmission cycle of packets. In the case where the transmission success rate of packets is less than or equal to the designated threshold value, if the electronic device 201 transmits a majority of packets at a low value of power, it may result in an efficiency decrease of the electronic device 201. To prevent the efficiency decrease, the AUSC 640 may determine to increase an output value of power of the electronic device 201, and decrease the number of transmitting packets per designated time interval. That is, the AUSC 640 may determine to change the transmission cycle of packets.

The AUSC 640 may acquire the indication information from the power control unit 630. The AUSC 640 may acquire the back-off value 436 from the indication information. Based on the back-off value 436, the AUSC 640 may determine a transmission cycle of packets. The transmission cycle of packets may be determined as in Equation (2) below.

$$Transmission\ Cycle = Floor\left[10^{\frac{P_{backoff}}{10}}\right] \quad (2)$$

Here, the transmission cycle refers to a transmission cycle of packets, and the $P_{backoff}$ refers to the back-off value 436. The floor function may be used such that the average value of SAR 480 does not exceed a limit amount at a constant interval.

From Equation (2) above, if the back-off value 436 determined in the power control unit 630 is 3 dB, the AUSC 640 may determine a transmission cycle of packets as 2.

The AUSC 640 may acquire, from the communication unit 510, a request message for transmitting of packets. The AUSC 640 may determine the transmission or non-transmission of packets, whenever acquiring the request message. The AUSC 640 may determine the transmission or non-transmission of packets every request message, thereby adjusting a transmission cycle of packets. If the transmission cycle of packets is determined to be 3, the AUSC 640 may transmit packets in response to only one request message (e.g., the third packet transmitting request), without transmitting packets in response to two request messages (e.g., the first and second packet transmitting requests). If the AUSC 640 responds to the transmitting request, the AUSC 640 may set the power limit reference value 430 as the maximum power threshold value 432 and transmit packets. That is, if the AUSC 640 responds to the transmitting request, the AUSC 640 may determine not to perform back-off. If the AUSC 640 responds to the transmitting request, the AUSC 640 may notify the power control unit 640 of the determined power limit reference value 430.

If the transmission success rate of packets is greater than or equal to a constant threshold value, the AUSC 640 may determine a transmission cycle as the reference cycle. That is, to secure more opportunities of transmission, the AUSC 640 may determine the transmission cycle as the reference cycle. If the transmission cycle is determined as the reference cycle, the AUSC 640 may determine the power limit reference value 430 as the back-off power limit value 434. Since transmission of more than a constant rate is secured, the AUSC 640 may control the electronic device 201 to transmit packets at the power limit reference value 430 lower than the maximum power threshold value 432.

The electronic device 201, according to an embodiment of the present disclosure, may include the control unit 520. The control unit 520 is configured to determine a value of SAR corresponding to the power of the electronic device 201 based on at least one of a state of the electronic device 201 and a distance between the electronic device 201 and a user of the electronic device 201, and determine an average value of SAR for a constant interval based on the determined value of SAR, and if the determined average value of SAR is greater than a first threshold value, determine a reference value for limiting the maximum power of the electronic device 201 as a value obtained by subtracting a designated value from a value of maximum output power of the electronic device 201. Based on the reference value, the communication unit 510 may transmit a signal.

The control unit 520, according to an embodiment of the present disclosure, may be configured to determine a SAR table based on at least one of a state of the electronic device 201 and a distance between the electronic device 201 and the user and based on the determined SAR table, determine a value of SAR corresponding to the power of the electronic device 201.

The control unit 520 according to an embodiment of the present disclosure may be configured to select a SAR table set corresponding to a state of the electronic device 201 to determine a SAR table and, based on a distance between the electronic device 201 and the user, determine the SAR table among the selected SAR table set.

The control unit 520, according to an embodiment of the present disclosure, may be further configured to determine a transmission rate of uplink packets and, based on the transmission rate of uplink packets, determine the change or non-change of a transmission cycle of a signal of the electronic device 201.

The control unit 520, according to an embodiment of the present disclosure, may be further configured to, if a transmission rate of packets is less than a designated lower limit threshold value, change a transmission cycle of a signal from a first value to a second value greater than the first value, and determine a reference value as a value of maximum output power. The second value may be determined based on a designated value. The designated value may be a value that is designated based on at least one of a state of the electronic device 201 and a distance between the electronic device 201 and the user.

The control unit 520, according to an embodiment of the present disclosure, may be further configured to, if a transmission rate of packets on a second value is less than a designated lower limit threshold value, change a transmission cycle of the signal from the second value to a first value, and determine a reference value as a value obtained by subtracting a designated value from a value of maximum output power.

The control unit 520, according to an embodiment of the present, disclosure may determine a second value based on Equation (2) above. The transmission cycle may refer the second value, and the $P_{backoff}$ may refer a designated value.

The control unit 520, according to an embodiment of the present disclosure, may be further configured to, if a transmission rate of packets is greater than a designated upper limit threshold value, determine a transmission cycle of a signal as a first value, and determine a reference value as a value obtained by subtracting a designated value from a value of maximum output power.

The control unit 520, according to an embodiment of the present disclosure, may be further configured to, if a determined average value of SAR is less than a second threshold value, determine a reference value as a value of maximum output power.

The electronic device 201, according to an embodiment of the present disclosure, may include the SAR table selection unit 610, the SAR operation unit 620, the power control unit 630, and the communication unit 510. The SAR table selection unit 610 is configured to determine a SAR table based on at least one of a state of the electronic device 201 and a distance between the electronic device 201 and a user of the electronic device 201. The SAR operation unit 620 is configured to determine a value of SAR corresponding to the power of the electronic device 201 based on the determined SAR table, and determine an average value of SAR for a designated interval based on the determined value of SAR. The power control unit 630 is configured to, if the determined average value of SAR is greater than a first threshold value, determine a reference value for limiting the maximum power of the electronic device 201, as a value obtained by subtracting a designated value from a value of maximum output power of the electronic device 201. The communication unit 510 is configured to transmit a signal based on the determined reference value.

The electronic device 201, according to an embodiment of the present disclosure, may further include the AUSC 640. The AUSC 640 is configured to determine a transmission rate of uplink packets, and determine a transmission cycle of a signal of the electronic device 201 based on the designated value and the transmission rate of uplink packets.

Figure 7:
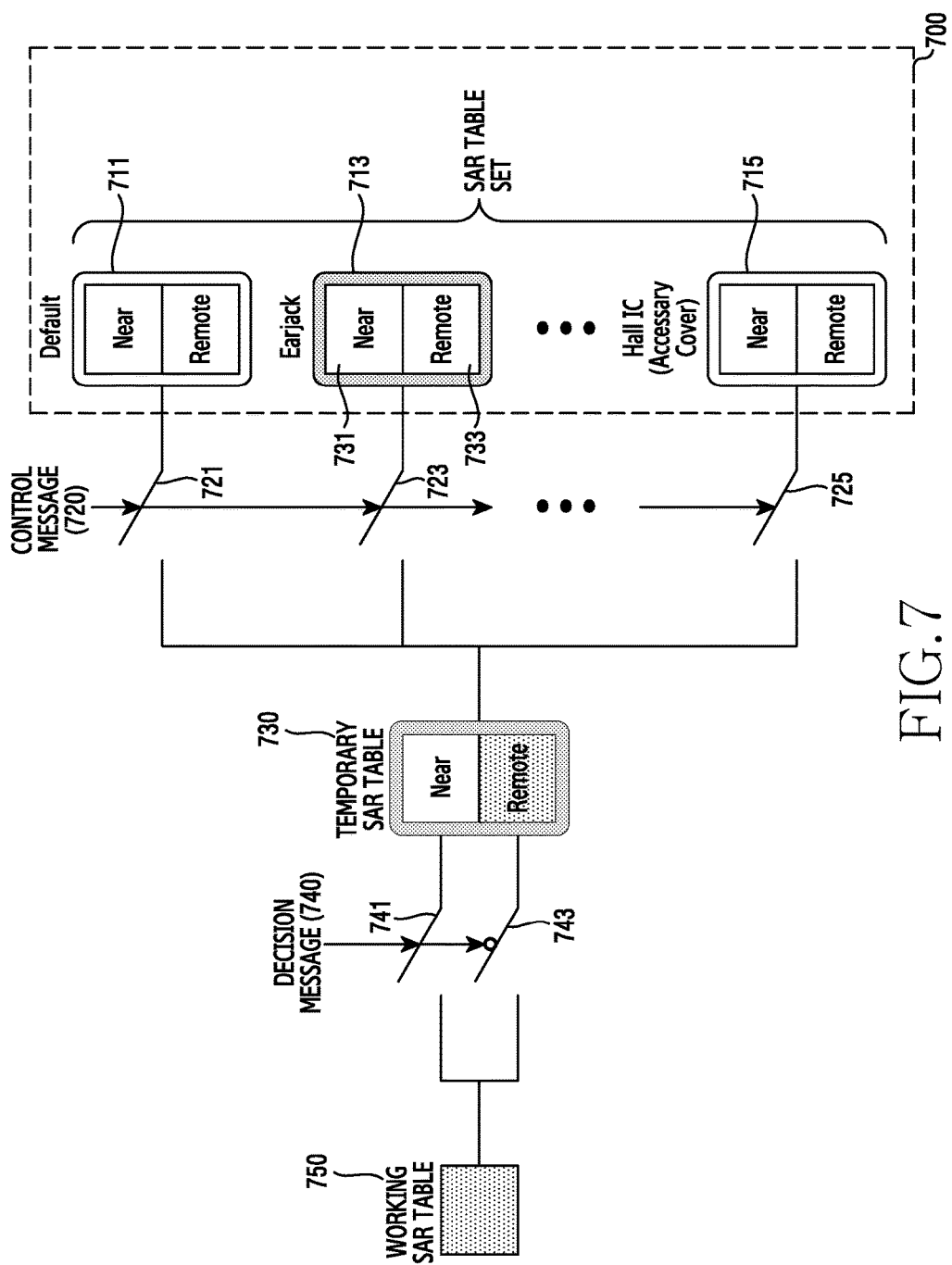
FIG. 7 illustrates a process of a SAR table selection unit, according to an embodiment of the present disclosure.

FIG. 7 illustrates a process of a SAR table selection unit, according to an embodiment of the present disclosure.

The SAR table selection unit may be the SAR table selection unit 610. The SAR table selection unit 610 may select a SAR table based on a plurality of SAR table sets stored in the storage unit 530 of FIG. 5. The plurality of SAR table sets may correspond to a plurality of events, respectively. The plurality of SAR table sets may include a SAR table set dependent on earphone jack insertion or non-insertion, charger connection or non-connection, and case mounting or non-mounting. The plurality of SAR table sets may be SAR table sets 700.

Referring to FIG. 7, the plurality of SAR table sets 700 include a SAR table set 711, a SAR table set 713, and a SAR table set 715. The SAR table set 711 may be a SAR table set corresponding to if an event is not detected. That is, the SAR table set 711 may be a SAR table set that is set as a default if an event is not detected. The SAR table set 713 may be a SAR table set that corresponds to earphone jack insertion. The SAR table set 715 may be a SAR table set that corresponds to if an accessory cover is mounted.

The SAR table sets each may include a plurality of SAR tables. The SAR table sets may each include a plurality of SAR tables dependent on a distance between the electronic device 201 and a user of the electronic device 201. The SAR table sets may include a first SAR table, a second SAR table, and a third SAR table. The first SAR table corresponds to if the distance between the electronic device 201 and the user is a first distance level. The second SAR table corresponds to if the distance between the electronic device 201 and the user is a second distance level. The third SAR table corresponds to if the distance between the electronic device 201 and the user is a third distance level. The distance level may be determined according to a designated scheme. The distance level may be determined at the time of designing of the electronic device 201 as well. In the following description, it is illustrated that the SAR table sets each have two SAR tables, but the present disclosure is not limited thereto.

The SAR table set 711, the SAR table set 713, and the SAR table set 715 may each include two SAR tables. As described above, the control unit 520 of FIG. 5 may determine whether the user is adjacent to the electronic device 201 based on a distance between the electronic device 201 and the user. The SAR table set may include a near SAR table and a remote SAR table. The near SAR table corresponds to if the user is adjacent to the electronic device 201. The remote SAR table corresponds to if the user is remote from the electronic device 201.

The SAR table set 711, the SAR table set 713 and the SAR table set 715 may be connected to a switch 721, a switch 723 and a switch 725, respectively. The switch 721, the switch 723 and the switch 725 may be connected to a temporary SAR table storage unit 730. If one of the switches turns ON, the SAR table selection unit 610 may store a corresponding table set in the temporary SAR table storage unit 730. If the switch 725 turns ON, the SAR table selection unit 610 may store the SAR table set 715 in the temporary SAR table storage unit 730.

The SAR table selection unit 610 may determine a state of the electronic device 201. The SAR table selection unit 610 may generate a control message 720 in accordance with the determined state of the electronic device 201. The control message 720 may be a control message according to an event detected from the detection unit 540 of FIG. 5. For example, in a case where the detection unit 540 detects earphone jack insertion, the SAR table selection unit 610 may generate the control message 720 of controlling to switch ON the switch 723. In accordance with the control message 720, the temporary SAR table storage unit 730 may store the SAR table set 713. The temporary SAR table storage unit 730 may store a near SAR table 731 and a remote SAR table 733 that are included in the SAR table set 713.

The SAR table selection unit 610 may determine a distance level of a distance between the electronic device 201 and the user. The distance level may include a first distance level and a second distance level in accordance with adjacency or non-adjacency. The first distance level may indicate that the distance between the user and the electronic device 201 is less than or equal to a designated distance. The second distance level may indicate that the distance between the user and the electronic device 201 is greater than or equal to the constant distance.

The temporary SAR table storage unit 730 may store a plurality of SAR tables correspondingly to the number of distance levels. The plurality of SAR tables stored in the temporary SAR table storage unit 730 may be connected to a plurality of switches, respectively. The temporary SAR table storage unit 730 may be connected to a switch 741 corresponding to the first distance level and/or a switch 743 corresponding to the second distance level.

The SAR table selection unit 610 may generate a decision message 740 in accordance with a determined distance level. The decision message 740 may be a control message dependent on a distance between the electronic device 201 and the user, detected from the detection unit 540. The SAR table selection unit 610 may determine a SAR table among SAR table sets stored in the temporary SAR table storage unit 730 through the decision message 740. The decision message 740 may be a message to switch ON a switch corresponding to the determined SAR table. If the SAR table set 713 is stored in the temporary SAR table storage unit 730, and the distance level is the first distance level, the SAR table selection unit 610 may select the near SAR table 731 among the SAR table set 713. That is, the SAR table selection unit 610 may generate the decision message 740 to switch ON the switch 741.

In accordance with the decision message 740, a working SAR table storage unit 750 may store one SAR table among SAR tables included in the temporary SAR table storage unit 730. The SAR table stored in the working SAR table storage unit 750 may be denoted as a working SAR table. The working SAR table may be used to determine the average value of SAR 480 of FIG. 4. That is, to determine the average value of SAR 480, the electronic device 201 may use the working SAR table, without applying an instantaneous value of power of the electronic device 201 as a value of SAR as it is. The electronic device 201 may determine a value of SAR corresponding to the instantaneous value of power, using the working SAR table. Based on the determined value of SAR, the electronic device 201 may determine the average value of SAR 480.

The SAR table selection unit 610 may use a reference algorithm in place of the SAR table set 711 as well. For example, in a case where a designated event is not detected, the SAR table selection unit 610 may use an algorithm of determining a value of power of the electronic device 201 as a value of SAR.

Figure 8A:
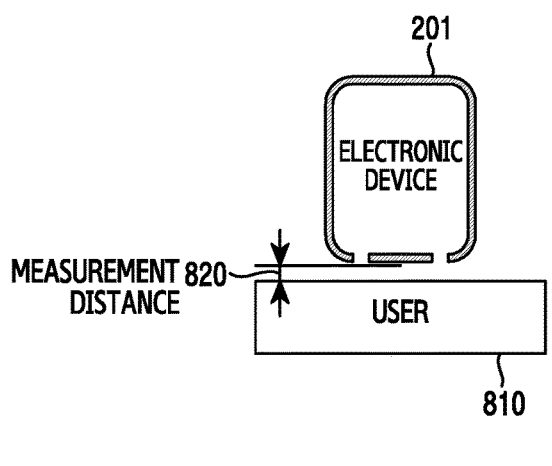
FIGS. 8A and 8B are illustrations of generating a SAR table dependent on a distance between a user and an electronic device, according to an embodiment of the present disclosure.
Figure 8B:
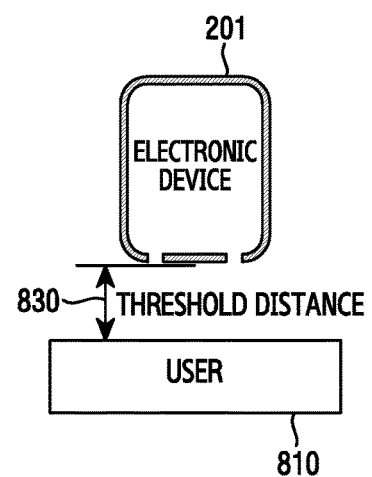

FIGS. 8A and 8B are illustrations of generating a SAR table dependent on a distance between a user and an electronic device. The electronic device may be the electronic device 201 of FIG. 2. The user may be a user of the electronic device 201.

Referring to FIGS. 8A and 8B, a user 810 of the electronic device 201 may keep a constant distance from the electronic device 201. The constant distance may be a measurement distance 820 corresponding to a first distance level or a threshold distance 830 corresponding to a second distance level. The SAR table sets of FIG. 7 each include a near SAR table corresponding to the first distance level and a remote SAR table corresponding to the second distance level.

To determine values of SAR included in the SAR tables of the SAR table set, the measurement of the value of SAR may be required. The value of SAR may be measured based on Equation (3) below.

$$SAR = \frac{d}{dt}\left(\frac{dW}{dm}\right) = \frac{d}{dt}\left(\frac{dW}{\rho(dV)}\right) \quad (3)$$

In Equation (3) above, SAR refers to a value of SAR intended for measurement, and W refers to absorbed energy, m refers to a mass of measured human tissue, ρ refers a density of the human tissue, and V refers to a volume and/or bulk of the human tissue.

Regarding the electromagnetic field varying regularly, Equation (3) above may be expressed as in Equation (4) below.

$$SAR = \frac{\sigma}{2\rho}|E_i|^2 \quad (4)$$

ρ may refer to a conductivity of the human tissue, and $E_i$ may refer to a peak value of an internal electromagnetic field.

The SAR tables may each include power output from the electronic device 201 and a value of SAR measured that corresponds to the power. The unit of power may be the Watt (W) or the decibel-milliwatt (dBm). The unit of the measured value of SAR may be W/kg or mW/g.

To determine values of SAR of a near SAR table, the measurement of the value of SAR at a measurement distance 820 may be required. The measurement distance 820 may be a SAR measurement distance that is declared in an international standards authentication institution (e.g., the International Electro-technical Commission (IEC) and Radio Equipment Directive (RED)). The measurement distance 820 may be one of 0 mm, 5 mm and 15 mm. The near SAR table may include a value of power that is output from the electronic device 201. The near SAR table may include a value of SAR that is measured in a state in which the electronic device 201 and the user 810 keep the measurement distance 820. The near SAR table may be defined as in Table 1 below.

TABLE 1

| Power (dBm) | SAR (W/kg) |
|---|---|
| 25 | 3.30 |
| 24 | 2.62 |
| 23 | 2.08 |
| 22 | 1.65 |

TABLE 1-continued

| Power (dBm) | SAR (W/kg) |
|---|---|
| 21 | 1.31 |
| 20 | 1.01 |

In a case where the measurement distance 820 is measured as 5 mm, if a value of power is 23 dBm, a value of SAR may be measured as 2.08 W per 1 kilogram (kg). The SAR operation unit 620 may determine the value of SAR, using Table 1 above. The SAR operation unit 620 may determine values of SAR corresponding to values of power that are not included in Table 1 above, using an interpolation method. If the electronic device 201 outputs power of 21.5 dBm, the SAR operation unit 620 of the electronic device 201 may determine a value of SAR as 1.47 W per 1 kg, using a linear interpolation method.

To determine values of SAR of a remote SAR table, the measurement of the value of SAR at a threshold distance 830 may be required. The threshold distance 830 may be a maximum distance that a sensor may recognize. For example, in the case of judging adjacency or non-adjacency between the user 810 and the electronic device 201 using the proximity sensor 240G of FIG. 2, the maximum distance that the proximity sensor 240G may recognize may be set as the threshold distance 830. Accordingly, while the value of SAR is measured at the threshold distance 830, it may reduce the chance that the SAR operation unit 620 determines a value of SAR less than a real value of SAR. The remote SAR table may be defined as Table 2 below.

TABLE 2

| Power (dBm) | SAR (W/kg) |
|---|---|
| 25 | 1.30 |
| 24 | 1.03 |
| 23 | 0.82 |
| 22 | 0.65 |
| 21 | 0.52 |
| 20 | 0.41 |

In a case where a value of SAR is measured at the threshold distance 830, if a value of power is 23 dBm, the value of SAR may be measured as 0.82 W per 1 kg. The SAR operation unit 620 may determine the value of SAR, using Table 2 above. The SAR operation unit 620 may determine a value of SAR corresponding to a value of power that is not included in Table 2 above, using an interpolation method as in Table 1 above.

Assuming the same value of power, a value of SAR included in a remote SAR table may be less than a value of SAR included in a near SAR table. That is, the electronic device 201 may measure a value of SAR based on a distance between the user 810 and the electronic device 201, thereby reducing a difference between a determined value of SAR and a real value of SAR. The electronic device 201 may determine a value of SAR being more approximate to the real value of SAR, thereby delaying a time of an occurrence of back-off. In addition, the electronic device 201 may shorten a restore period upon a back-off occurrence as well.

Figure 9:
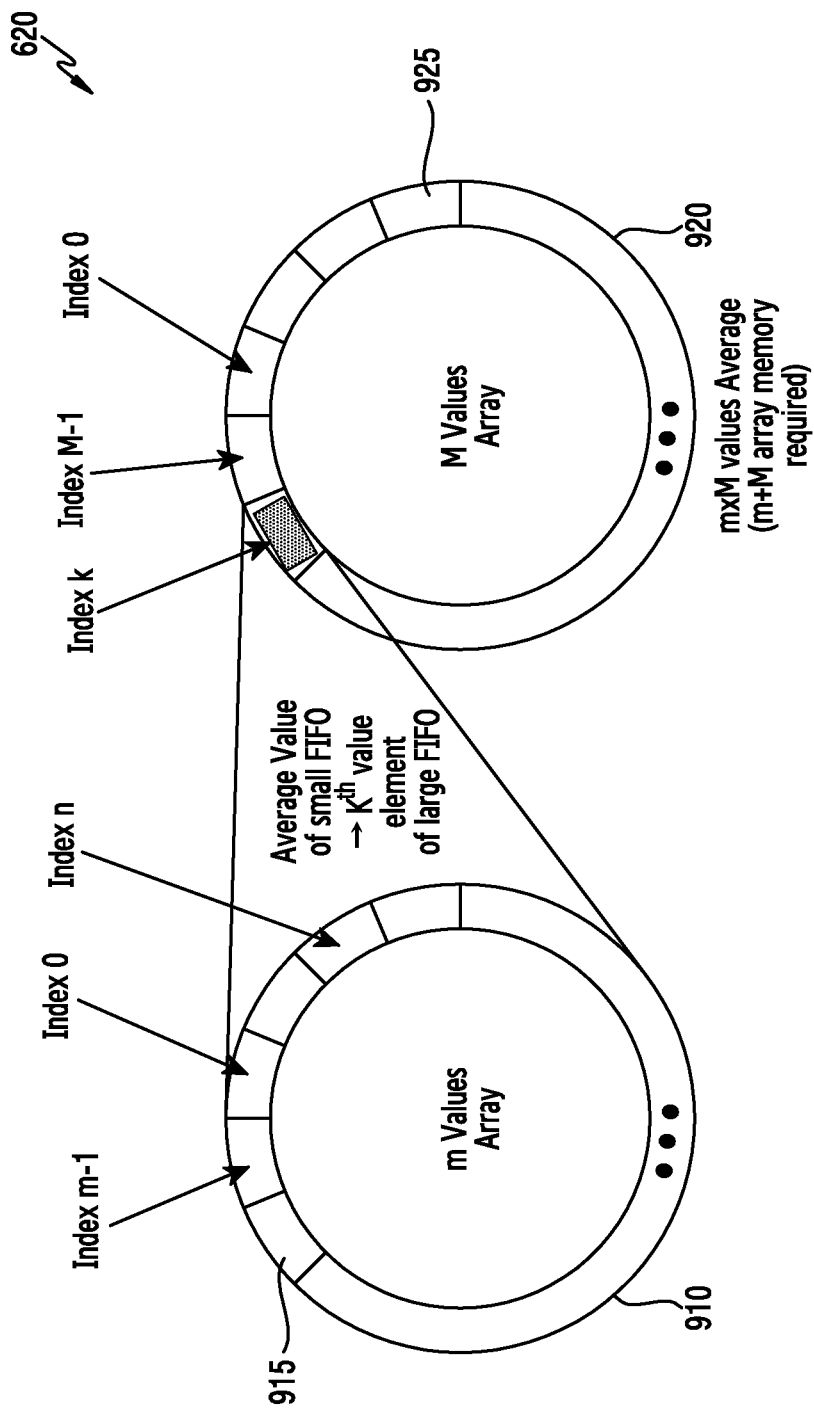
FIG. 9 illustrates a process of determining an average value of SAR, according to an embodiment of the present disclosure.

FIG. 9 illustrates a process of determining an average value of SAR in accordance with an embodiment of the present disclosure. The average value of SAR may be the average value of SAR 480 of FIG. 4. The SAR operation unit 620 of the electronic device 201 may determine the average value of SAR 480 for an average interval. The average interval may be the unit of time for determining the average value of SAR 480. To determine the average value of SAR 480, the SAR operation unit 620 may determine a plurality of values of SAR for a plurality of interval units. The interval unit may be the unit of determining a value of SAR. The interval unit may be a minimum cycle measurable. To determine the average value of SAR 480, the SAR operation unit 620 may store an arbitrary value for the interval unit. To determine an average value of SAR 480 for a next average interval, the SAR operation unit 620 may use the stored arbitrary value for the interval unit.

Referring to FIG. 9, the SAR operation unit 620 may store arbitrary values for determining a value of SAR. To determine the average value of SAR 480, the SAR operation unit 620 may store values of SAR for an interval unit. To determine the average value of SAR 480, the SAR operation unit 620 may store values of power for an interval unit. The SAR operation unit 620 may determine a value of power for a buffer interval or a value of power for an average interval through operation (e.g., averaging) of the values of power for the interval unit. The SAR operation unit 620 may convert the determined value of power for the buffer interval or value of power for the average interval into a corresponding value of SAR, thereby determining the average value of SAR 480 for the average interval. For example, to determine the average value of SAR 480, the SAR operation unit 620 may store an arbitrary parameter as well. The SAR operation unit 620 may convert the arbitrary parameter, to determine the average value of SAR 480 as well. The SAR operation unit 620 may store a value of power or a value of SAR as more compressed data, thereby securing the efficiency of a storage space. The following description is made on the basis of storing values of SAR in the storage space, but values of various formats may be stored as well.

In the description of FIG. 9 below, a FIFO structure is described as an example regarding the storage space, but another data structure scheme may be used as well.

The SAR operation unit 620 may store values of SAR for a plurality of interval units. The SAR operation unit 620 may store, in the storage unit 530 of FIG. 5, the values of SAR for the plurality of interval units. The SAR operation unit 620 may store, in a buffer within the control unit 530, the values of SAR for the plurality of interval units as well.

To store a plurality of SAR values, the SAR operation unit 620 may require a majority of storage spaces. To determine an average value of SAR 480 for an average interval, the SAR operation unit 620 may store a plurality of SAR values for a plurality of interval units. For example, in case where the electronic device 201 uses an LTE system, the unit of measurement of values of SAR may be 1 ms. To determine an average value of SAR 480 for 6 minutes, the SAR operation unit 620 may store 360,000 values of SAR.

However, a memory capacity of the storage unit 530 or a capacity of the buffer within the control unit 520 is limited, so the SAR operation unit 620 may be required to manage the values of SAR efficiently.

To manage the values of SAR efficiently, the SAR operation unit 620 may use a FIFO structure. The FIFO structure may include two arrays. The two arrays may be circular arrays. The two arrays may be a small array 910 and a large array 920. The small array 910 may include m first storage spaces 915. The first storage spaces 915 may store a value of SAR for an interval unit. The large array 920 may include M second storage spaces 925. The second storage spaces 925 may store a SAR related value for a buffer interval. The buffer interval may represent a cycle of determining an average value of SAR 480. That is, the SAR operation unit 620 may determine a cycle of updating the average value of SAR 480 every buffer interval. The buffer interval may be defined as a multiple of the interval unit. The buffer interval may be determined in accordance with a size of the storage space of the small array 910.

If the SAR operation unit 620 determines a value of SAR for an interval unit, the SAR operation unit 620 may store the value of SAR in the small array 910. If the SAR operation unit 620 stores all m values of SAR in the m first storage spaces 915, the SAR operation unit 620 may determine an average value of the m values of SAR. The average value may be denoted as a SAR buffer value. The SAR operation unit 620 may store the SAR buffer value in the second storage space 925.

If the m values of SAR are all stored in the m first storage spaces 915, the SAR operation unit 620 may empty all m first storage spaces 915. This operation may be denoted as a flush operation. By the flush operation, the electronic device 201 may again secure m storage spaces every buffer interval. The electronic device 201 may efficiently utilize the storage spaces of the first array 910 in accordance with time flow.

The SAR operation unit 620 may store the SAR buffer value in the second storage spaces 925 in sequence. For example, in a case where a SAR buffer value for a previous buffer interval has been stored in a third-index of the second storage spaces 925, the SAR operation unit 620 stores a SAR buffer value for a current buffer interval in a fourth-index of the second storage space 925. In a case where an arbitrary value has been stored in a corresponding-index of the second storage spaces 925, the SAR operation unit 620 may delete the corresponding value from the corresponding-index of the second storage spaces 925, and store a SAR buffer value for a current buffer interval in the corresponding-index of the second storage spaces 925. The SAR operation unit 620 deletes one stored SAR buffer value every M buffer intervals and, accordingly, the electronic device 201 may again secure M storage spaces every buffer interval. That is, the electronic device 201 may efficiently utilize the storage spaces of the second array 920 in accordance with time.

After an initial average interval, the SAR operation unit 620 may store a new SAR buffer value every buffer interval. In an embodiment of the present disclosure, before the initial average interval, the SAR operation unit 620 may determine an average value of SAR 480 by filling a blank storage space with a value of zero that is a SAR buffer value. Before the initial average interval, a possibility in which the electronic device 201 will back off a power limit reference value is low. Before the initial average interval, the SAR operation unit 620 may determine an average value of SAR for an interval ranging from a measurement start time to a current time. Accordingly, the electronic device 201 may acquire an average value of SAR that is more approximate to a real value of SAR. The electronic device 201 may be more advantageous in terms of harmfulness to the human body than by determining the average value of SAR for the average interval by filling with the value of zero.

Whenever a SAR buffer value is stored in the second storage spaces 925, the SAR operation unit 620 may take an average value of buffer values of SAR corresponding to the M second storage spaces 925 to determine an average value of SAR 480. If the SAR buffer value is stored in the second storage spaces 925, the SAR operation unit 620 updates the average value of SAR 480. That is, the SAR operation unit 620 may update the average value of SAR 480 every buffer interval. The buffer interval may be an update cycle.

Through the FIFO structure, the electronic device 201 may efficiently store a plurality of (m×M) values of SAR using (m+M) storage spaces.

Figure 10:
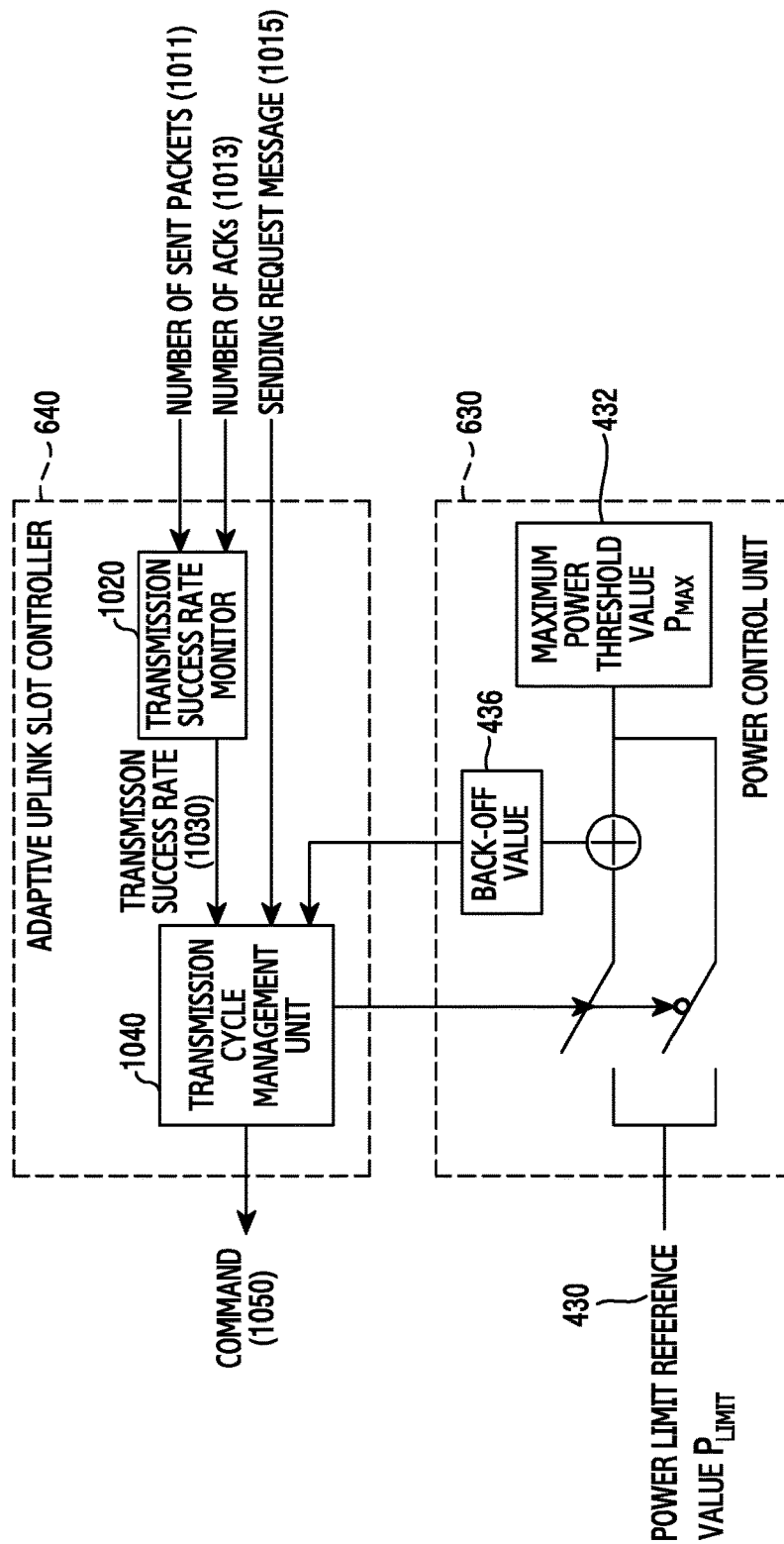
FIG. 10 illustrates a configuration of an adaptive uplink slot controller (AUSC), according to an embodiment of the present disclosure.

FIG. 10 illustrates a configuration of an AUSC according to an embodiment of the present disclosure.

The AUSC may be the AUSC 640 of FIG. 6. The AUSC 640 may be operatively coupled to the power control unit 630 of FIG. 6. In an embodiment of the present disclosure, some operations of the AUSC 640 may be carried out after a back-off operation of the power control unit 630. That is, after the power control unit 630 sets the power limit reference value 430 as the back-off power limit value 434, the AUSC 640 may determine the change or non-change of a transmission cycle of packets, based on the back-off value 436. The AUSC 640 may operate in parallel with the back-off operation of the power control unit 630 as well. That is, the AUSC 640 may determine the change or non-change of the transmission cycle of packets, based on a built-in back-off value as well.

The AUSC 640 may determine whether to change a transmission cycle of packets based on the comparison result of the average value of SAR 480 and a threshold value. In an embodiment of the present disclosure, the AUSC 640 may be triggered or be disabled based on the comparison result. If the average value of SAR 480 exceeds the upper limit threshold value 481, the AUSC 640 may be triggered to initiate operation. If the average value of SAR 480 is less than or equal to the lower limit threshold value 483, the AUSC 640 may be disabled. If the AUSC 640 is triggered and driven, the AUSC 640 may determine whether to change the transmission cycle of packets. A difference between the upper limit threshold value 481 and the lower limit threshold value 483 may be denoted as a hysteresis quantity.

The AUSC 640 may receive the comparison result from the SAR operation unit 620 of FIG. 6. The AUSC 640 may acquire the comparison result in the process of driving. The comparison result may indicate one of three pieces of information. The three pieces of information may include first information, second information and third information. The first information indicates that the average value of SAR 480 exceeds the upper limit threshold value 481. The second information indicates that the average value of SAR 480 is greater than the lower limit threshold value 483, and is less than or equal to the upper limit threshold value 481. The third information indicates that the average value of SAR 480 is less than or equal to the lower limit threshold value 483. If the comparison result indicates the first information, the AUSC 640 may determine whether to change a transmission cycle of the packets. The AUSC 640 may determine the transmission cycle of that packets as a value greater than the reference cycle. The reference cycle may be a transmission cycle of transmitting the packets whenever there is a request for transmission of the packets. The reference cycle may be 1.

Referring to FIG. 10, the AUSC 640 may include a transmission success rate monitor 1020 and a transmission cycle management unit 1040.

The transmission success rate monitor 1020 may determine a transmission success rate of packets. The packets may be uplink packets. The transmission success rate monitor 1020 may receive a first value 1011 and a second value 1013 from the communication unit 510 of FIG. 5. The first value 1011 may represent the number of transmitted or sent packets. The second value 1013 may represent the number of ACKs corresponding to the transmitted packets. Based on the first value 1011 and the second value 1013, the transmission success rate monitor 1020 may determine a transmission success rate 1030. The transmission success rate 1030 may be determined based on Equation (1) above. The transmission success rate monitor 1020 may forward, to the transmission cycle management unit 1040, information indicating the transmission success rate 1030.

The transmission cycle management unit 1040 may acquire the transmission success rate 1030 based on the information received from the transmission success rate monitor 1020. The transmission cycle management unit 1040 may compare the transmission success rate 1030 and a success rate threshold value. The success rate threshold value may include an upper limit success rate threshold value and a lower limit success rate threshold value.

If the transmission success rate 1030 is less than or equal to the lower limit success rate threshold value, the transmission cycle management unit 1040 may determine to set a transmission cycle of packets greater than the reference cycle. If the transmission success rate 1030 is less than or equal to the lower limit success rate threshold value, the transmission cycle management unit 1040 may set the transmission cycle of packets greater than the reference cycle (e.g., 2). If there are two packet transmission requests, the transmission cycle management unit 1040 may transmit packets one time.

If the transmission success rate 1030 is greater than or equal to the upper limit success rate threshold value, the transmission cycle management unit 1040 may set a transmission cycle of packets as the reference cycle. The reference cycle may be 1.

If the transmission success rate 1030 exceeds the lower limit success rate threshold value and is less than the upper limit success rate threshold value, the transmission cycle management unit 1040 may not change a transmission cycle of packets. That is, the transmission cycle of packets may be the same as the transmission cycle before determining the transmission success rate 1030.

The transmission cycle management unit 1040 may determine a transmission cycle of packets based on the back-off value 436. In FIG. 10, it is illustrated that the back-off value 436 is determined in the power control unit 630, but the back-off value 436 may be a value that is stored as a certain value in the transmission cycle management unit 1040 as well. The transmission cycle management unit 1040 may determine the transmission cycle of packets based on the back-off value 436 and Equation (2) above. If the back-off value 436 determined in the power control unit 630 is 4 dB, the transmission cycle management unit 1040 may determine the transmission cycle of packets as 3.

The transmission cycle management unit 1040 may receive a transmission request message 1015 from the communication unit 510. The transmission cycle management unit 1040 may determine transmission of packets in response to the transmission request message 1015. The transmission cycle management unit 1040 may transmit packets based on the determined transmission cycle of packets. If the determined transmission cycle is 3, the transmission cycle management unit 1040 may control not to transmit packets based on two of transmission request messages. The transmission cycle management unit 1040 may transmit packets based on one of transmission request messages. The transmission cycle management unit 1040 may transmit packets without the back-off of power, at the time of packet transmission. The transmission cycle management unit 1040 may transmit a control message for controlling the power control unit 630. In accordance with the control message, the power control unit 630 may set the power limit reference value 430 as the maximum power threshold value 432. If the determined transmission cycle is 1, the transmission cycle management unit 1040 may transmit packets every transmission request message. The transmission cycle management unit 1040 may transmit packets in a state in which power has been backed off, at the time of packet transmission. The transmission cycle management unit 1040 may transmit a control message for controlling the power control unit 630. In accordance with the control message, the power control unit 630 may set the power limit reference value 430 as the back-off power limit value 434.

An operation of not transmitting packets may be denoted as a packet drop. In a case where the transmission success rate 1030 is not guaranteed as a constant rate or more, the electronic device 201 may enhance the transmission success rate 1030 through higher-power transmission. For the higher-power transmission, the packet drop may be required. Instead of transmitting packets at low power in response to all transmission requests, the electronic device 201 may transmit the packets at high power in response only to some transmission requests, thereby improving an opportunity of transmission success. The transmission success may signify receiving ACK on transmitted packets. For example, if the transmission success rate 1030 is less than 5% because of a back-off of 10 dB, the electronic device 201 may change a transmission cycle to get a transmission success rate of approximately 10%.

In response to a transmission request message, the AUSC 640 may transmit a command 1050 to the communication unit 510. The command may be a drop command or a transmission command. The AUSC 640 may transmit the drop command to the communication unit 510 in order to perform a packet drop. The communication unit 510 may drop (i.e., not transmit) packets in accordance with the drop command. The AUSC 640 may transmit the transmission command to the communication unit 510 in order to transmit packets as well. The communication unit 510 may transmit packets in accordance with the transmission command.

Figure 11:
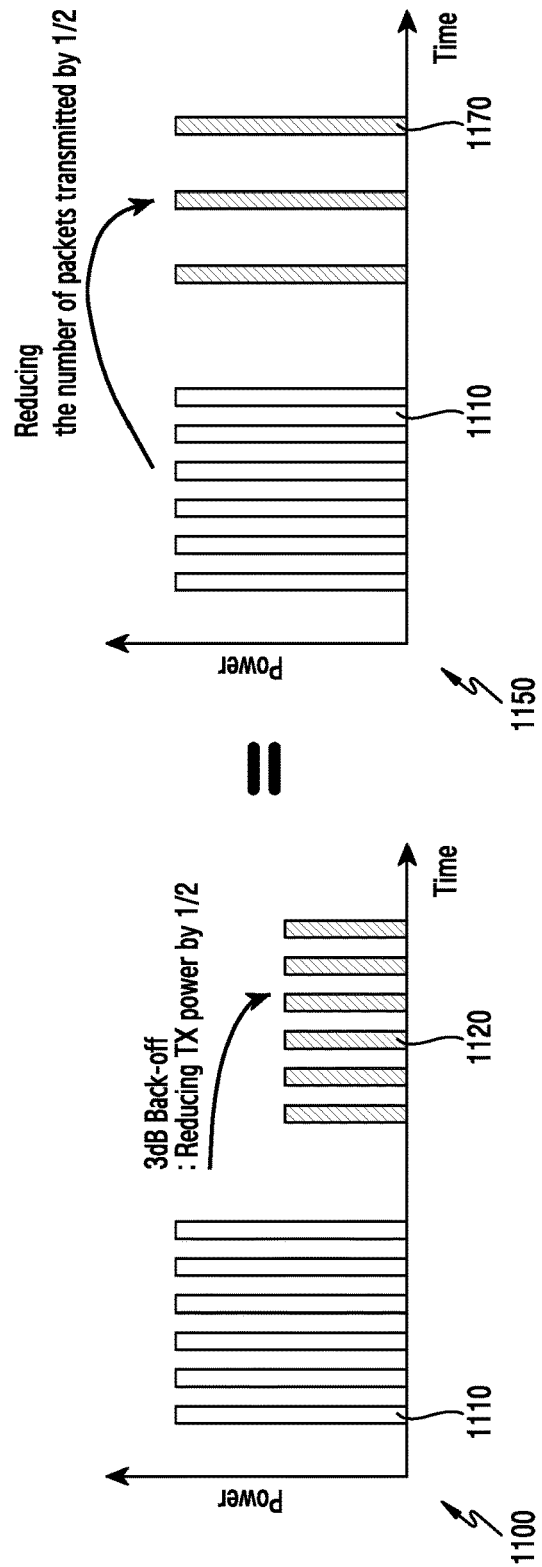
FIG. 11 illustrates transmission of packets according to an operation of an AUSC, according to an embodiment of the present disclosure.

FIG. 11 illustrates transmission of packets according to an operation of an AUSC, according to an embodiment of the present disclosure. The AUSC may be the AUSC 640 of FIG. 6. The transmission of the packets may be performed by the communication unit 510 of FIG. 5.

Referring to FIG. 11, a graph 1100 represents maximum power reduction. A horizontal axis of the graph 1100 indicates time, and a vertical axis of the graph 1100 indicates a power limit reference value. The power control unit 630 of FIG. 6 may determine a back-off value of a maximum power as 3 dB. In response to the back-off value of 3 dB, the power control unit 630 may set the power limit reference value as a value corresponding to a half of the existing value. The existing value may be the maximum power threshold value 432 of FIG. 4. The value corresponding to half of the existing value may be the back-off power limit value 434 of FIG. 4. If transmitting a packet 1120 at the back-off power limit value 434, the electronic device 201 transmits the packet 1120 at a relatively lower power than if transmitting a packet 1110 at the maximum power threshold value 432. Thus, a transmission success rate of the packet 1120 of the electronic device 201 may be reduced.

A graph 1150 represents transmission cycle control. A horizontal axis of the graph 1150 indicates time, and a vertical axis of the graph 1150 indicates a power limit reference value being set. The power control unit 630 may determine a back-off value of a maximum power as 3 dB. To fix a problem in which a low power results in a low transmission success rate, the AUSC 640 may change a transmission cycle of a packet 1170 to a value greater than a reference cycle. In response to the back-off value 3 dB, the AUSC 640 may determine the transmission cycle of the packet 1170 as 2. The transmission cycle of the packet 1170 may be determined based on Equation (2) above.

The packet 1110 may include six packets. The packet 1170 may include three packets. Instead of reducing the number of transmission of packets, the electronic device 201 may set a power limit reference value as the maximum power limit value 432. Similarly to when transmitting the packet 1110, the electronic device 201 may transmit the packet 1170 at the maximum power threshold value 432. Upon transmission of the packet 1170, the electronic device 201 may achieve the same transmission success rate as a transmission success rate as before the back-off.

Figure 12:
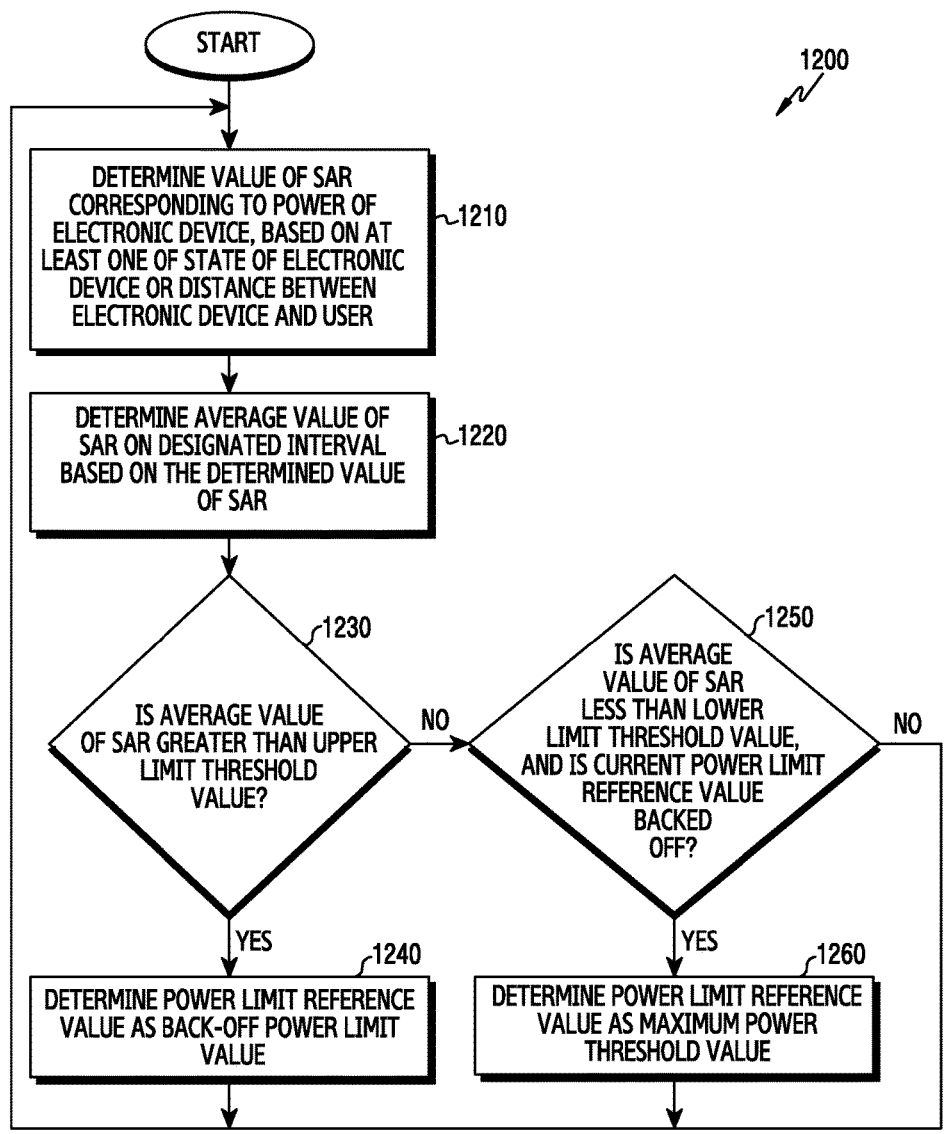
FIG. 12 illustrates a flowchart of a method of an electronic device, according to an embodiment of the present disclosure.

FIG. 12 illustrates a flowchart of a method 1200 of an electronic device according to an embodiment of the present disclosure. The electronic device may be the electronic device 201 of FIG. 2. The electronic device 201 may include the control unit 520 of FIG. 5.

Referring to FIG. 12, in step 1210, the control unit 520 may determine a value of SAR corresponding to the power of the electronic device 201, based on at least one of a state of the electronic device 201 and a distance between the electronic device 201 and a user of the electronic device 201.

The control unit 520 may determine a state of the electronic device 201. To determine the state of the electronic device 201, the control unit 520 may determine the detection or non-detection of a certain event. The certain event may be an event that affects a magnetic field between the electronic device 201 and the user. The event may be an event in which the electronic device 201 is pairing connected to another external electronic device. The event may be an event in which the electronic device 201 receives a handover request from a base station as well. For example, the event may be an event of turning ON a speaker phone.

The control unit 520 may determine a distance between the electronic device 201 and the user. To determine the distance between the electronic device 201 and the user, the control unit 520 may use a sensor. The sensor may include at least one of a proximity sensor, an illuminance sensor, a distance sensor and/or a medical sensor.

In an embodiment of the present disclosure, the control unit 520 may use a stored SAR table. The control unit 520 may determine a SAR table that corresponds to at least one of a state of the electronic device 201 and a distance between the electronic device 201 and the user. The control unit 520 may determine power that is output from the electronic device 201. The unit in which the control unit 520 determines the output power may be an interval unit. The control unit 520 may determine the power output from the electronic device 201 every interval unit. By using the determined SAR table, the control unit 520 may determine a value of SAR that corresponds to the power output from the electronic device 201.

In step 1220, based on the determined value of SAR, the control unit 520 may determine an average value of SAR for a designated (e.g. constant) interval. The designated interval may be denoted as an average interval. The designated interval may be denoted as an average time as well. The control unit 520 may average a plurality of SAR values for a plurality of interval units to determine the average value of SAR for the average time. If the interval unit is 1 ms and the average time is 6 minutes, the control unit 520 may average a plurality of 360,000 values of SAR for the interval unit of 1 ms to determine an average value of SAR for an average time of 6 minutes.

In step 1230, the control unit 520 may determine whether the average value of SAR for the designated interval is greater than an upper limit threshold value. The upper limit threshold value may be determined considering the presence of harmfulness to the human body. That is, if the average value of SAR is greater than the upper limit threshold value, the control unit 520 may determine that an electromagnetic wave output from the electronic device 201 would forward more than an allowable amount to the human body.

If the average value of SAR is greater than the upper limit threshold value, the control unit 520 may perform step 1240. If the average value of SAR is not greater than the upper limit threshold value, the control unit 520 may perform step 1250.

In step 1240, the control unit 520 may determine a power limit reference value as a back-off power limit value.

If the average value of SAR exceeds the upper limit threshold value, the control unit 520 may determine the back-off of the power limit reference value. The back-off operation may be carried out for a band in which the average value of SAR exceeds the upper limit threshold value. If the average value of SAR exceeds the upper limit threshold value, the control unit 520 may determine to set the power limit reference value lower than the maximum power threshold value in consideration of the extent of harmfulness to the human body.

The power limit reference value indicates a limit value of power the electronic device 201 is permitted to output. The maximum power threshold value indicates a value of power the electronic device 201 may output maximally. The back-off power limit value is a value less than the maximum power threshold value. A difference between the back-off power limit value and the maximum power threshold value is a back-off value. In an embodiment of the present disclosure, the back-off value may be determined based on at least one of the state of the electronic device 201 and the distance between the electronic device 201 and the user, as in step 1210.

In step 1250, the control unit 520 may determine whether the average value of SAR for the constant interval is less than the lower limit threshold value, and a current power limit reference value has been backed off.

The lower limit threshold value may be determined in consideration of the duration of a restore period. If the lower limit threshold value is low, the control unit 520 may require a relatively longer time for the restore period. In an embodiment of the present disclosure, the restore period may be determined based on the hysteresis quantity as well.

If the average value of SAR is not less than the lower limit threshold value, or the current power limit reference value is not the backed-off back-off power limit value, the control unit 520 may sustain the current power limit reference value. The power limit reference value may be a maximum power threshold value. If the average value of SAR is less than the lower limit threshold value and the current power limit reference value is the back-off power limit value, the control unit 520 may perform step 1260.

In step 1260, the control unit 520 may determine the power limit reference value as the maximum power threshold value. In a case where the average value of SAR is less than the lower limit threshold value, and the current power limit reference value has been backed off, the control unit 520 may determine the power limit reference value as the maximum power threshold value. That is, if the restore period lapses, the control unit 520 may again determine the power limit reference value as the maximum power threshold value. The restore period may be the restore period 470 of FIG. 4. The restore period may be a period for which the power limit reference value is set as the back-off power limit value.

The method 1200 of the control unit 520 may be carried out repeatedly. In an embodiment of the present disclosure, the control unit 520 may repeatedly perform the method 1200 every interval unit. The interval unit may be an interval that corresponds to a single element of the first array 910 of FIG. 9. The interval unit may be the unit of measuring power. The control unit 520 may repeatedly perform the method 1200 every buffer interval as well. The buffer interval may be a buffer interval that corresponds to the whole size of the first array 910 of FIG. 9. Whenever the method 1200 is repeated, the control unit 520 may acquire a new average value of SAR. That is, the control unit 520 may cyclically update an average value of SAR.

Figure 13:
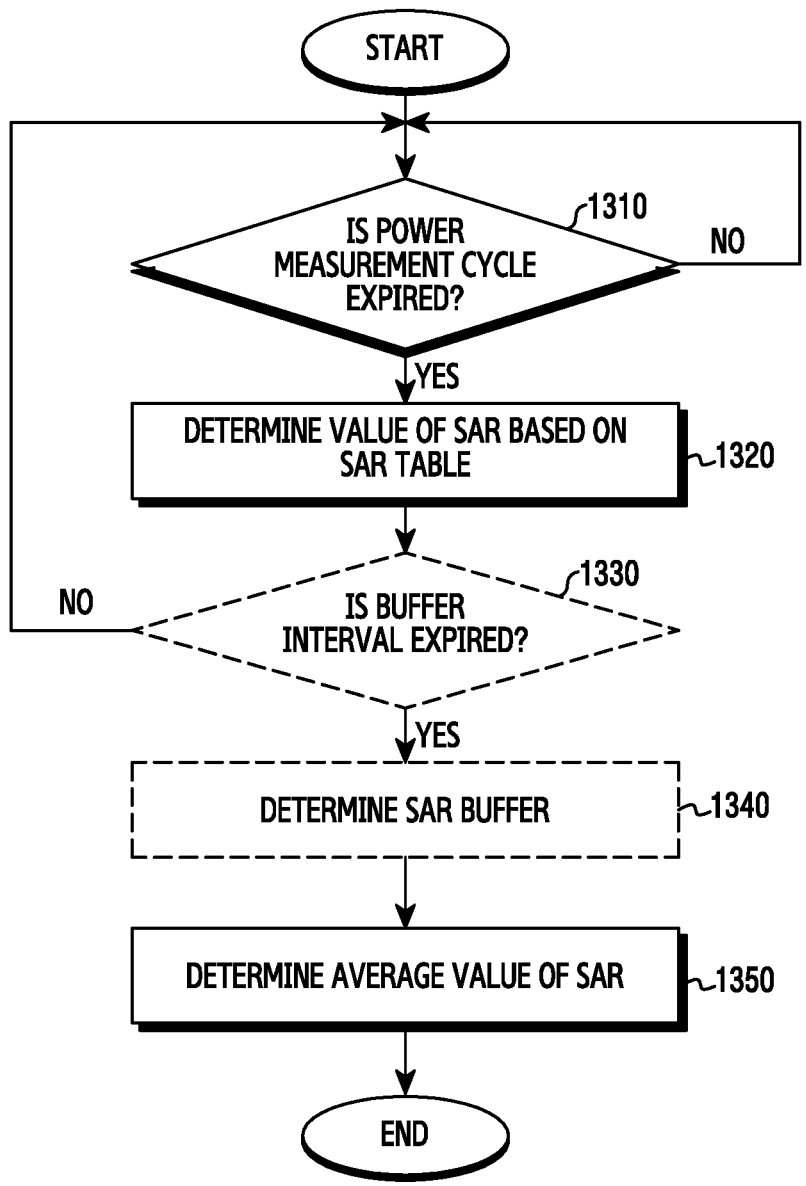
FIG. 13 illustrates a flowchart of a method of determining an average value of SAR of an electronic device, according to an embodiment of the present disclosure.

FIG. 13 illustrates a flowchart of a method of determining an average value of SAR in an electronic device according to an embodiment of the present disclosure. The electronic device may be the electronic device 201 of FIG. 2. The electronic device 201 may include the control unit 520 of FIG. 5.

Referring to FIG. 13, in step 1310, the control unit 520 may detect if a measurement cycle of power has expired. The measurement cycle of the power may be denoted as an interval unit. The interval unit may have various values in accordance with a communication system. The interval unit may be 1 ms in an LTE communication system.

If the measurement cycle of the power has not expired, the control unit 520 determines expiration or non-expiration of the measurement cycle until the measurement cycle expires. If the measurement cycle of the power has expired, the control unit 520 may perform step 1320.

In step 1320, the control unit 520 may determine a value of SAR based on a SAR table.

The control unit 520 may determine a SAR table. The control unit 520 may determine the SAR table corresponding to at least one of a state of the electronic device 201 and a distance between the electronic device 201 and the user. The storage unit 530 of the electronic device 201 may store a plurality of SAR tables including the SAR table.

The control unit 520 may determine the power of the electronic device 201. The control unit 520 may determine the power of the electronic device 201 whenever the power measurement cycle expires. The power of the electronic device 201 may be the power the electronic device 201 outputs. The power of the electronic device 201 may be the transmitting power of the electronic device 210 when the electronic device 201 transmits uplink packets.

The control unit 520 may determine a value of SAR corresponding to the power of the electronic device 201 using the selected SAR table. The SAR table may include a plurality of SAR tables corresponding to a plurality of values of power, respectively. In the case of a value of power not being included in the SAR table, the control unit 520 may determine a value of SAR of the value of power not included in the SAR table using an interpolation method.

In step 1350, the control unit 520 may determine an average value of SAR. The control unit 520 may identify the average value of SAR using values of SAR corresponding to a plurality of interval units and a value of SAR corresponding to a current interval unit. The average value of SAR may be an average value of SAR for an average time. The average time may be a time that is a sum of the plurality of interval units and the current interval unit.

However, when determining an average value of SAR using only values of SAR, the electronic device 201 may be required to store many values of SAR. To store fewer values of SAR while determining the average value of SAR, the control unit 520 may use a SAR buffer value according to the FIFO structure of FIG. 9. A description of step 1330 and step 1340 below is a description for the FIFO structure, and the control unit 520 may optionally perform steps below.

In step 1330, the control unit 520 may detect if a buffer interval has expired. The buffer interval may be determined as a multiple of the interval unit. The buffer interval may correspond to a size of the first array 910 of FIG. 9. If the buffer interval has not expired, the control unit 520 may repeatedly perform step 1310 and step 1320 until the buffer interval is expired. If the buffer interval has expired, the control unit 520 may perform step 1340.

In step 1340, the control unit 520 may determine a SAR buffer value. The control unit 520 may average a plurality of SAR values corresponding to the buffer interval to thereby determine the SAR buffer value.

In step 1350, the control unit 520 may determine an average value of SAR. In an embodiment of the present disclosure, the control unit 520 may determine the average value of SAR using a SAR buffer value that is determined based on a value of SAR. The control unit 520 may identify the average value of SAR using values of SAR corresponding to a plurality of buffer intervals and a SAR buffer value corresponding to a current buffer interval. The average value of SAR may be an average value of SAR for an average time. The average time may be a time that is a sum of the plurality of buffer intervals and the current buffer interval.

Figure 14:
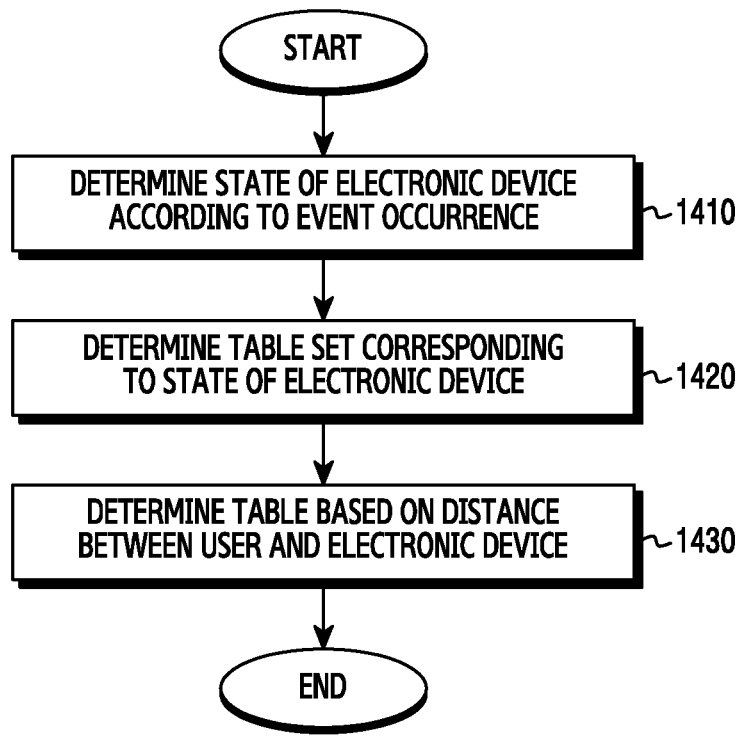
FIG. 14 illustrates a flowchart of a method of determining a SAR table of an electronic device, according to an embodiment of the present disclosure.

FIG. 14 illustrates a flowchart of a method of determining a SAR table in an electronic device according to an embodiment of the present disclosure. The electronic device may be the electronic device 201 of FIG. 2. The SAR table may be the SAR table of operation 1320 of FIG. 13.

Referring to FIG. 14, in step 1410, the control unit 520 may determine a state of the electronic device 201. Upon an event occurrence, the control unit 520 may determine the state of the electronic device 201. The event may be an event that is internally designated in the electronic device 201. That is, when detecting the event occurrence, the control unit 520 may determine if the event is a designated event. The designated event may be an event that affects the state of the electronic device 201. The event may be an event that affects a magnetic field between the electronic device 201 and a user of the electronic device 201. The event may be an event that generates a difference between power output from the electronic device 201 and power absorbed by the user. The event may be an event of driving a Wi-Fi module ON. If the Wi-Fi module turns ON, this may cause a change in a rate of an electromagnetic wave that the electronic device 201 radiates to the user, because a state of a wireless channel is varied.

If the designated event is not detected, the control unit 520 may determine a state of the electronic device 201 as a default state. In an embodiment of the present disclosure, in a case where a plurality of events are concurrently detected, the control unit 520 may combine the plurality of events to determine a single state of the electronic device 201. The control unit 520 may determine the state of the electronic device 201 based on a high-priority event among the plurality of events as well. The state of the electronic device 201 may correspond to one control message. The control message may correspond to a certain SAR table set.

In step 1420, the control unit 520 may determine a table set corresponding to the state of the electronic device 201.

The control unit 520 may determine a table set that corresponds to a state of the electronic device 201 dependent on an event occurrence. The control unit 520 may generate a control message dependent on the state of the electronic device 201. The control unit 520 may transmit the control message to the storage unit 530 of the electronic device 201. The storage unit 530 may include a plurality of SAR table sets. In an embodiment of the present disclosure, the plurality of SAR table sets may correspond to a plurality of states of the electronic device, respectively. The plurality of states of the electronic device may be determined in combination of designated events as well. The plurality of SAR table sets may correspond to a plurality of events, respectively.

The control unit 520 may acquire a SAR table set indicated by the control message, from the storage unit 530.

In a case where a designated event is not detected, the control unit 520 may determine a SAR table set corresponding to a default state as well. The SAR table set corresponding to the default state may be a SAR table set that is set as a default. The control unit 520 may not determine the SAR table set. If the SAR table is set as the default state, the control unit 520 may determine a measured value of power as a value of SAR.

In step 1430, the control unit 520 may determine a SAR table among the SAR table set based on a distance between a user of the electronic device 201 and the electronic device 201. The SAR table set may include a plurality of SAR tables. The plurality of SAR tables may correspond to a plurality of distance levels, respectively.

In an embodiment of the present disclosure, the control unit 520 may determine a distance between the user of the electronic device 201 and the electronic device 201. The control unit 520 may determine the distance using a sensor. The sensor may determine the distance using at least one of the gyro sensor 240A, the acceleration sensor 240E, the grip sensor 240F and the medical sensor 240I of FIG. 2. In a case where the electronic device 201 further has a distance sensor, the control unit 520 may determine the distance using the distance sensor as well.

The control unit 520 may use information about a plurality of distance levels. In an embodiment of the present disclosure, the control unit 520 may determine a distance between the user of the electronic device 201 and the electronic device 201 as one of the plurality of distance levels. If the distance between the user and the electronic device 201 is less than or equal to a threshold value, the control unit 520 may determine the distance as a first distance level. If the distance between the user and the electronic device 201 exceeds the threshold value, the control unit 520 may determine the distance as a second distance level.

In an embodiment of the present disclosure, if exact distance measurement is difficult, the control unit 520 may determine one of a plurality of distance levels based on approximate distance measurement. For example, if a constant input is detected through a medical sensor, the control unit 520 may determine that a distance between the user and the electronic device 201 should be within a constant distance value. The control unit 520 may determine the distance between the user and the electronic device 201 as a first distance level. If a constant input is not sensed through the medical sensor, the control unit 520 may determine that a distance between the user and the electronic device 201 is greater than or equal to the constant distance value. The control unit 520 may determine the distance between the user and the electronic device 201 as a second distance level.

The control unit 520 may determine a SAR table corresponding to the determined distance level among the determined SAR table sets.

Figure 15:
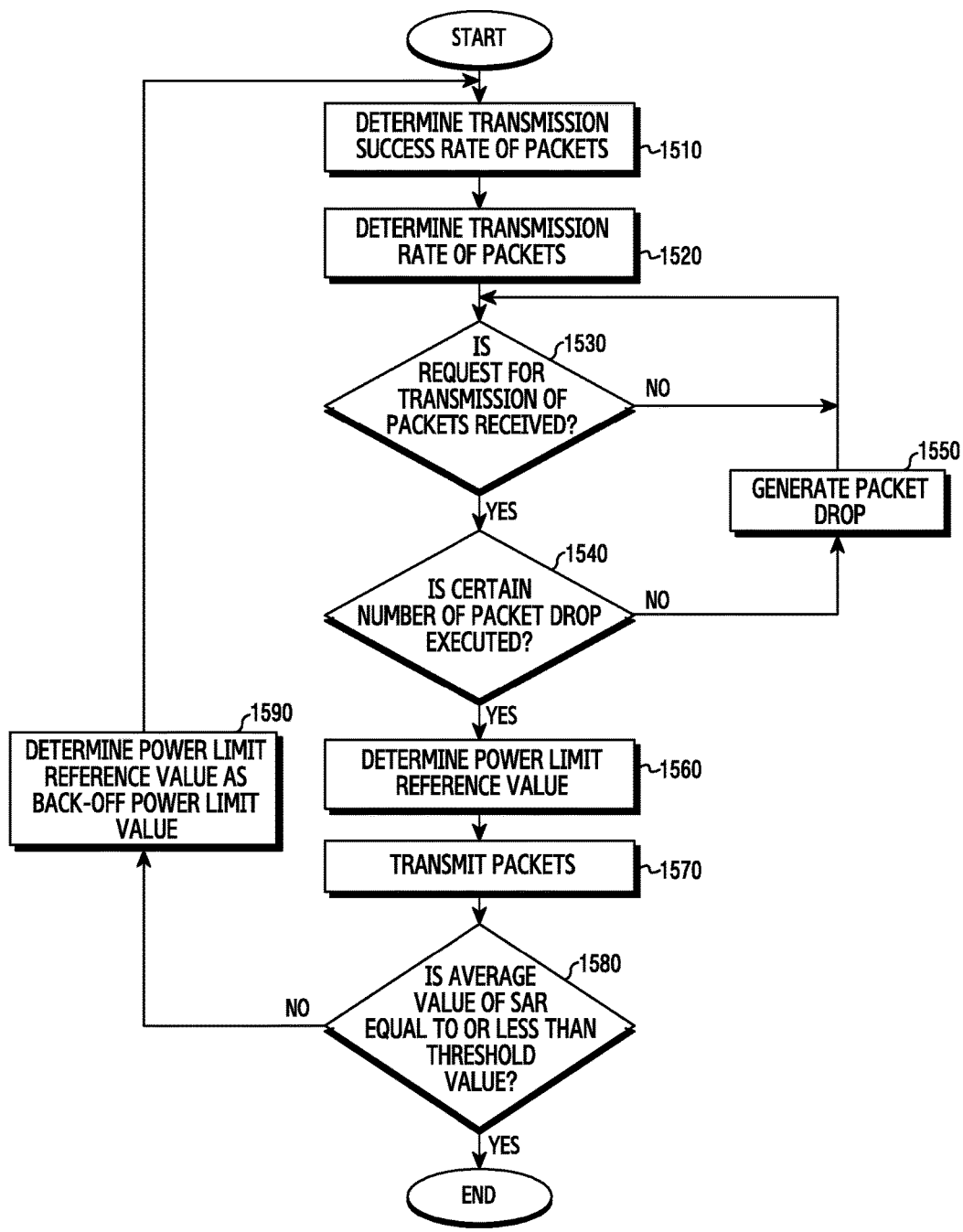
FIG. 15 illustrates a flowchart of a method of controlling a transmission cycle, according to an embodiment of the present disclosure.

FIG. 15 illustrates a flowchart of a method of controlling a transmission cycle according to an embodiment of the present disclosure. An operation of controlling the transmission cycle may be carried out by the AUSC 640 of FIG. 6. The following description is of a situation after the power control unit 630 of FIG. 6 determines back-off, i.e., a situation in which the power control unit 630 determines a power limit reference value as a back-off power limit value. That is, the electronic device 201 may control the transmission cycle at the restore period 470 of FIG. 4.

Referring to FIG. 15, in step 1510, the AUSC 640 may determine a transmission success rate of packets. The AUSC 640 may acquire information about the number of transmitted packets and information about the number of ACKs corresponding to the number of transmitted packets from the communication unit 510 of FIG. 5. Based on the acquired information, the AUSC 640 may determine the transmission success rate of the packets. The transmission success rate may be determined based on Equation (1) above. In addition, the AUSC 640 may repeatedly perform step 1520 to step 1590 described below, thereby repeatedly updating the transmission success rate of the packets. For example, if packets are transmitted in step 1570 described below, the AUSC 640 may update the transmission success rate of the packets based on the reception or non-reception of ACK on the packets.

In step 1520, the AUSC 640 may determine a transmission rate (or cycle) of the packets. The AUSC 640 may determine the transmission cycle of the packets based on the determined transmission success rate of the packets. The transmission cycle may be denoted as a duty cycle. If the transmission success rate is less than or equal to a constant threshold value, the AUSC 640 may change the transmission cycle from a reference cycle to a value being greater than the reference cycle. The constant threshold value may be a threshold value for guaranteeing a minimum quality of packet communication. The reference cycle may be 1, and the transmission cycle may be 3. If the transmission cycle is 3, the electronic device 201 may transmit packets in response to only one transmission request message among three transmission request messages. That is, the electronic device 201 may not transmit packets in response to two transmission request messages. The electronic device 201 may drop the packets in response to the two transmission request messages.

If the transmission success rate exceeds the designated threshold value, the AUSC 640 may not change the transmission cycle. Though not setting the power limit reference value as the maximum power threshold value, if acquiring the transmission success rate greater than the constant threshold value, the AUSC 640 may sustain the transmission cycle as the reference cycle without changing the transmission cycle. In a case where the transmission cycle is the reference cycle, the electronic device 201 may transmit packets in response to each of the transmission requests. The transmission success rate is guaranteed to be greater than the designated threshold value, so there are no substantive gains in which the electronic device 201 decreases the number of transmission. The electronic device 201 may not drop packets. That is, if it is determined that little effect is made due to the improvement of the transmission success rate through repetition of step 1510 to step 1590, the AUSC 640 may sustain the power limit reference value as the back-off power limit value, and sustain the transmission cycle as the reference cycle. By not changing the transmission cycle, the AUSC 640 may secure more opportunities for transmission.

In step 1530, the AUSC 640 determines whether it has received a request for transmission of packets. The AUSC 640 may receive the request for transmission of packets from the communication unit 510. If the AUSC 640 receives the request for transmission of packets, the AUSC 640 may perform step 1540. If the AUSC 640 does not receive the request for transmission of packets, the AUSC 640 may wait until reception of a request for transmission.

In step 1540, the AUSC 640 may determine whether a certain number of packet drops has been performed. The AUSC 640 may determine the certain number based on the changed transmission cycle. The AUSC 640 may determine the certain number as a value obtained by subtracting one from the determined transmission cycle. If the determined transmission cycle is 6, the AUSC 640 may determine the certain number as 5. If the AUSC 640 sustains the transmission cycle as the reference cycle, the AUSC 640 may determine the certain number as a value of zero. The AUSC 640 may perform step 1560 with no packet drop.

If the certain number of packet drops is not performed, in step 1550, the AUSC 640 may perform a packet drop, and count the number of packet drops.

The AUSC 640 may repeatedly perform step 1530, step 1540 and step 1550 until the certain number of packet drops has been performed. If the certain number of packet drops has been performed, the AUSC 640 may perform step 1560.

In step 1560, the AUSC 640 may determine a power limit reference value. In a case where the packet drop has been performed, the AUSC 640 may change the power limit reference value to a maximum power threshold value. By setting the power limit reference value to the maximum power threshold value instead of dropping some packets, the electronic device 201 may enhance the transmission success rate.

In a case where the packet drop has not been performed, the AUSC 640 may determine the power limit reference value as a back-off power limit value. That is, in a case where the packet drop has not been performed, the AUSC 640 may sustain a current transmission success rate by not changing the power limit reference value of packets.

In step 1570, the communication unit 510 of FIG. 5 may transmit packets.

The AUSC 640 may forward the determined power limit reference value to the power control unit 630. The power control unit 630 may forward the received power limit reference value to the communication unit 510. The communication unit 510 may transmit the packets, based on the power limit reference value acquired from the power control unit 630.

In step 1580, the SAR operation unit 620 may determine whether an average value of SAR is less than or equal to a threshold value. The average value of SAR may be the average value of SAR 480 of FIG. 4. The threshold value may be the lower limit threshold value 483 of FIG. 4. The SAR operation unit 620 may determine the average value of SAR 480, which is varied according to the transmission operation of step 1570. The SAR operation unit 620 may determine if the average value of SAR 480 is less than or equal to the lower limit threshold value 483, thereby determining a time to end the restore period 470.

If the average value of SAR 480 is less than or equal to the lower limit threshold value 483, the AUSC 640 may terminate the operation of controlling the transmission cycle. If it is determined that the average value of SAR 480 should be less than or equal to the lower limit threshold value 483, the AUSC 640 may determine the power limit reference value as the maximum power threshold value, as described above with reference to FIG. 4. That is, if the power limit reference value is changed in step 1560, the AUSC 640 may change the power limit reference value to the maximum power threshold value. If the transmission cycle is changed in step 1520, the AUSC 640 may change the transmission cycle to the reference cycle. That is, the electronic device 201 may revert to a state of no back-off to again operate.

In a case where the average value of SAR 480 exceeds the lower limit threshold value 483, the AUSC 640 may perform step 1590.

In step 1590, the AUSC 640 may determine the power limit reference value as the back-off power limit value. That is, to determine the change or non-change of the transmission cycle, the AUSC 640 may reset the power limit reference value. In a case where the transmission success rate of packets updated in step 1510 does not yet exceed a designated threshold value, the AUSC 640 may determine that an operation of changing the transmission cycle should not be required. Accordingly, the AUSC 640 may be required to maintain a state that existed before the operation of controlling of the transmission cycle. If there is a change of the transmission cycle in step 1520 and the power limit reference value in step 1560, the AUSC 640 may be required to perform a rollback. The AUSC 640 may set the power limit reference value as the back-off power limit value.

If the power limit reference value is determined as the back-off power limit value, the electronic device 201 may repeatedly perform step 1510 to step 1580 in order to again determine whether to change the transmission cycle.

In an embodiment of the present disclosure, if a transmission success rate is not guaranteed even after a packet drop, the AUSC 640 may determine the transmission cycle as the reference cycle. That is, if the transmission success rate is not guaranteed even if the power limit reference value is increased, the AUSC 640 may not perform control and management of the transmission cycle. To enhance the transmission success rate through more transmission opportunities, the communication unit 510 may transmit packets every transmission request.

A method of operating the electronic device 201 according to an embodiment of the present disclosure may include determining a value of SAR corresponding to the power of the electronic device 201 based on at least one of a state of the electronic device 201 and a distance between the electronic device 201 and a user of the electronic device 201, determining an average value of SAR for a constant interval based on the determined value of SAR, and if the determined average value of SAR is greater than a first threshold value, determining a reference value for limiting a maximum power of the electronic device 201 as a value obtained by subtracting a designated value from a value of power the electronic device 201 may output maximally, and transmitting a signal based on the reference signal.

The method of operating the electronic device 201 according to an embodiment of the present disclosure may include determining a SAR table based on at least one of the state of the electronic device 201 and the distance between the electronic device 201 and the user of the electronic device 201 in order to determine the value of SAR, and determining the value of SAR corresponding to the power of the electronic device 201, based on the determined SAR table.

The method of operating in the electronic device 201 according to an embodiment of the present disclosure may include selecting a SAR table set corresponding to the state of the electronic device 201 in order to determine the SAR table, and determining the SAR table among the selected SAR table set based on the distance between the electronic device 201 and the user.

The method of operating the electronic device 201 according to an embodiment of the present disclosure may further include determining a transmission rate of uplink packets, and determining the change or non-change of a transmission cycle of a signal of the electronic device 201 based on the transmission rate of the uplink packets.

The method of operating in the electronic device 201 according to an embodiment of the present disclosure may further include, if the transmission rate of packets is less than a designated lower limit threshold value, changing the transmission cycle of the signal from a first value to a second value greater than the first value, and determining the reference value as the value of power that may be output maximally. The second value may be determined based on the designated value. The designated value may be a value that is designated based on at least one of the state of the electronic device 201 and the distance between the electronic device 201 and the user.

The method of operating the electronic device 201 according to an embodiment of the present disclosure may further include, if the transmission rate of packets for the second value is less than the designated lower limit threshold value, changing the transmission cycle of the signal from the second value to the first value, and determining the reference value as the value obtained by subtracting the designated value from the value of power that may be output maximally.

According to an embodiment of the present disclosure, the second value may be determined based on Equation (2) above. Transmission Cycle may refer to the second value, and $P_{backoff}$ may refer to the designated value.

The method of operating the electronic device 201 according to an embodiment of the present disclosure may further include, if the transmission rate of packets is greater than a designated upper limit threshold value, determining the transmission cycle of the signal as the first value, and determining the reference value as the value obtained by subtracting the designated value from the value of power that may be output maximally as well.

The method of operating the electronic device 201 according to an embodiment of the present disclosure may further include, if the determined average value of SAR is less than a second threshold value, determining the reference value as the value of power that may be output maximally.

The method of operating the electronic device 201 according to an embodiment of the present disclosure may further include transmitting packets based on the determined reference value for limiting the maximum power of the electronic device.

An apparatus and method according to an embodiment of the present disclosure of the present disclosure may determine a value of SAR based on adjacency or non-adjacency between a user and an electronic device and the occurrence or non-occurrence of an event, and accurately predict an average numerical value of SAR affecting the user.

An apparatus and method according to an embodiment of the present disclosure of the present disclosure may minimize a reduction of output, using an accurate value of SAR.

An apparatus and method according to an embodiment of the present disclosure of the present disclosure may adjust a transmission cycle of a signal to enhance a transmission success rate.

Embodiments described above and in the accompanying drawings only suggest examples so as to easily explain the content of the present disclosure and facilitate understanding thereof, and are not intended to limit the scope of the present disclosure. Accordingly, the scope of the present disclosure is intended to be construed to include all modified or changed forms that are drawn on the basis of the present disclosure, in addition to the embodiments disclosed herein.

While embodiments of the present disclosure are described above, various modifications are available without departing from the scope and spirit of the present disclosure. Therefore, the scope of the present disclosure is not intended to be defined by the embodiments of the present disclosure but is defined by the appended claims and their equivalents.

What is claimed is:

1. An electronic device, comprising:
a communication unit;
a memory storing instructions; and
a processer, coupled to the communication unit and the memory, configured to execute the instructions to:
determine, based on at least one of a state of the electronic device and a distance between the electronic device and a user of the electronic device, a value of specific absorption rate (SAR) corresponding to a power of the electronic device;
determine, based on the determined value of SAR, an average value of SAR on a designated time interval;
determine, in response to the average value of SAR being greater than a first designated value, a reference value limiting a maximum power of the electronic device; and
transmit a signal based on the determined reference value through the communication unit,
wherein the reference value comprises a value obtained by subtracting a second designated value from a value of maximum output power of the electronic device.

2. The electronic device of claim 1, wherein the processor is further configured to execute the instructions to:
determine a SAR table based on at least one of the state of the electronic device and the distance between the electronic device and the user of the electronic device; and
determine, based on the determined SAR table, the value of SAR corresponding to the value of SAR that corresponds to the power of the electronic device.

3. The electronic device of claim 1, wherein the processor is further configured to execute the instructions to:
determine a SAR table set corresponding to the state of the electronic device; and
determine, based on the distance between the electronic device and the user of the electronic device, the SAR table among the determined SAR table set.

4. The electronic device of claim 1, wherein the processor is further configured to execute the instructions to:
identify a transmission rate of one or more uplink packets; and
based on the identified transmission rate, determine whether to change a transmission cycle of the signal of the electronic device.

5. The electronic device of claim 4, wherein the processor is further configured to execute the instructions to:
if the transmission rate is less than a designated minimum value, change a transmission cycle of the signal from a first value to a second value,
wherein the second value is greater than the first value; and determine the reference value with the value of maximum output power.

6. The electronic device of claim 5, wherein the second value is determined based on the second designated value, and
wherein the second designated value is determined based on at least one of the state of the electronic device and the distance between the electronic device and the user of the electronic device.

7. The electronic device of claim 5, wherein the processor is further configured to execute the instructions to:
if the transmission rate on the second value is less than the designated minimum value, change the transmission cycle of the signal from the second value to the first value; and
determine the reference value,
wherein the reference value comprises the value obtained by subtracting the second designated value from the value of maximum output power of the electronic device.

8. The electronic device of claim 5, wherein the second value is determined based on an equation as follows:

$$\text{Transmission Cycle} = \text{Floor}\left[10^{-\frac{P_{backoff}}{10}}\right]$$

wherein Transmission Cycle is the second value, $P_{backoff}$ is the second designated value, and Floor is a function to round an input number down below a decimal point.

9. The electronic device of claim 4, wherein the processor is further configured to execute the instructions to:
determine the transmission cycle of the signal with the first value, in response to the transmission rate being greater than a designated maximum value; and
determine that the reference value comprises the value obtained by subtracting the second designated value from the value of maximum output power of the electronic device.

10. The electronic device of claim 1, wherein the processor is further configured to execute the instructions to determine the reference value with the value of maximum output power in response to the determined average value of SAR being less than the second value.

11. A method of an electronic device, the method comprising:
determining, based on at least one of a state of the electronic device and a distance between the electronic device and a user of the electronic device, a value of specific absorption rate (SAR) corresponding to a power of the electronic device;
determining, based on the determined value of SAR, an average value of SAR on a designated time interval;
determining, in response to the average value of SAR being greater than a first designated value, a reference value limiting a maximum power of the electronic device; and
transmitting a signal based on the determined reference value,
wherein the reference value comprises a value obtained by subtracting a second designated value from a value of maximum output power of the electronic device.

12. The method of claim 11, further comprising:
determining a SAR table based on at least one of the state of the electronic device and the distance between the electronic device and a user of the electronic device; and
determining, based on the determined SAR table, the value of SAR corresponding to the value of SAR that corresponds to the power of the electronic device.

13. The method of claim 11, further comprising:
determining a SAR table set corresponding to the state of the electronic device; and
determining, based on the distance between the electronic device and the user of the electronic device, the SAR table among the determined SAR table set.

14. The method of claim 11, further comprising:
identifying a transmission rate of one or more uplink packets; and
based on the identified transmission rate, determining whether to change a transmission cycle of the signal of the electronic device.

15. The method of claim 14, further comprising:
if the transmission rate is less than a designated minimum value, changing a transmission cycle of the signal from a first value to a second value, wherein the second value is greater than the first value; and
determining the reference value with the value of maximum output power.

16. The method of claim 15, wherein the second value is determined based on the second designated value, and
wherein the second designated value is determined based on at least one of the state of the electronic device and the distance between the electronic device and the user of the electronic device.

17. The method of claim 15, further comprising:
if the transmission rate on the second value is less than the designated minimum value, changing the transmission cycle of the signal from the second value to the first value; and
determining the reference value,
wherein the reference value comprises the value obtained by subtracting the second designated value from the value of maximum output power of the electronic device.

18. The method of claim 15, wherein the second value is determined based on an equation as follows:

$$\text{Transmission Cycle} = \text{Floor}\left[10^{-\frac{P_{backoff}}{10}}\right]$$

wherein Transmission Cycle is the second value, $P_{backoff}$ is the second designated value, and Floor is a function to round an input number down below a decimal point.

19. The method of claim 14, further comprising:
determining the transmission cycle of the signal with the first value, in response to the transmission rate being greater than a designated maximum value; and
determining that the reference value comprises the value obtained by subtracting the second designated value from the value of maximum output power of the electronic device.

20. The method of claim 11, further comprising:
determining the reference value with the value of maximum output power in response to the determined average value of SAR being less than the second value.

* * * * *